United States Patent
Kuffner, Jr.

(10) Patent No.: US 11,299,292 B2
(45) Date of Patent: Apr. 12, 2022

(54) DEPLOYABLE LANDING PADS FOR VERTICAL LANDING AND TAKEOFF VEHICLES AND METHODS INCORPORATING THE SAME

(71) Applicant: Toyota Jidosha Kabushiki Kaisha, Toyota (JP)

(72) Inventor: James J. Kuffner, Jr., Minato-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 16/527,761

(22) Filed: Jul. 31, 2019

(65) Prior Publication Data
US 2021/0031944 A1 Feb. 4, 2021

(51) Int. Cl.
*B64F 1/00* (2006.01)
(52) U.S. Cl.
CPC ........ *B64F 1/007* (2013.01); *B64C 2201/208* (2013.01)
(58) Field of Classification Search
CPC ...... B64F 1/007; B64F 1/32; B64C 2201/208; B64C 2201/20; B64C 2201/201; B64C 39/024
See application file for complete search history.

(56) References Cited

U.S. PATENT DOCUMENTS

| | | | |
|---|---|---|---|
| 8,424,802 B2* | 4/2013 | Tripier-Larivaud | B64F 1/007 244/114 R |
| 9,187,186 B2* | 11/2015 | Besenzoni | E01F 3/00 |
| 10,457,420 B2* | 10/2019 | Heinonen | B60L 53/51 |
| 2005/0230537 A1* | 10/2005 | Chouery | B64F 1/007 244/116 |
| 2009/0236470 A1* | 9/2009 | Goossen | B64C 39/024 244/115 |
| 2017/0158353 A1* | 6/2017 | Schmick | B60L 53/12 |
| 2019/0039751 A1* | 2/2019 | Janssen | B64C 39/024 |

FOREIGN PATENT DOCUMENTS

| | | | |
|---|---|---|---|
| JP | H9049210 A | | 2/1997 |
| JP | H9302628 A | | 11/1997 |

* cited by examiner

*Primary Examiner* — Medhat Badawi
*Assistant Examiner* — Vicente Rodriguez
(74) *Attorney, Agent, or Firm* — Dinsmore & Shohl LLP

(57) ABSTRACT

A method of deploying a landing pad, for a vertical takeoff and landing vehicle, relative to a surface of an environment in which the landing pad is disposed, includes stowing an adjustable body of the landing pad in a stowed state. The adjustable body includes a platform surface that in the stowed state defines a first planar surface area relative to the surface, the first planar surface area being inoperable to receive the vertical takeoff and landing vehicle thereon. The method includes deploying the adjustable body from the stowed state to a deployed state. In the deployed state the platform surface defines a second planar surface area greater than the first planar surface area, the second surface planar area of the platform surface is sized and shaped to receive the vertical takeoff and landing vehicle thereon in the deployed state.

12 Claims, 15 Drawing Sheets

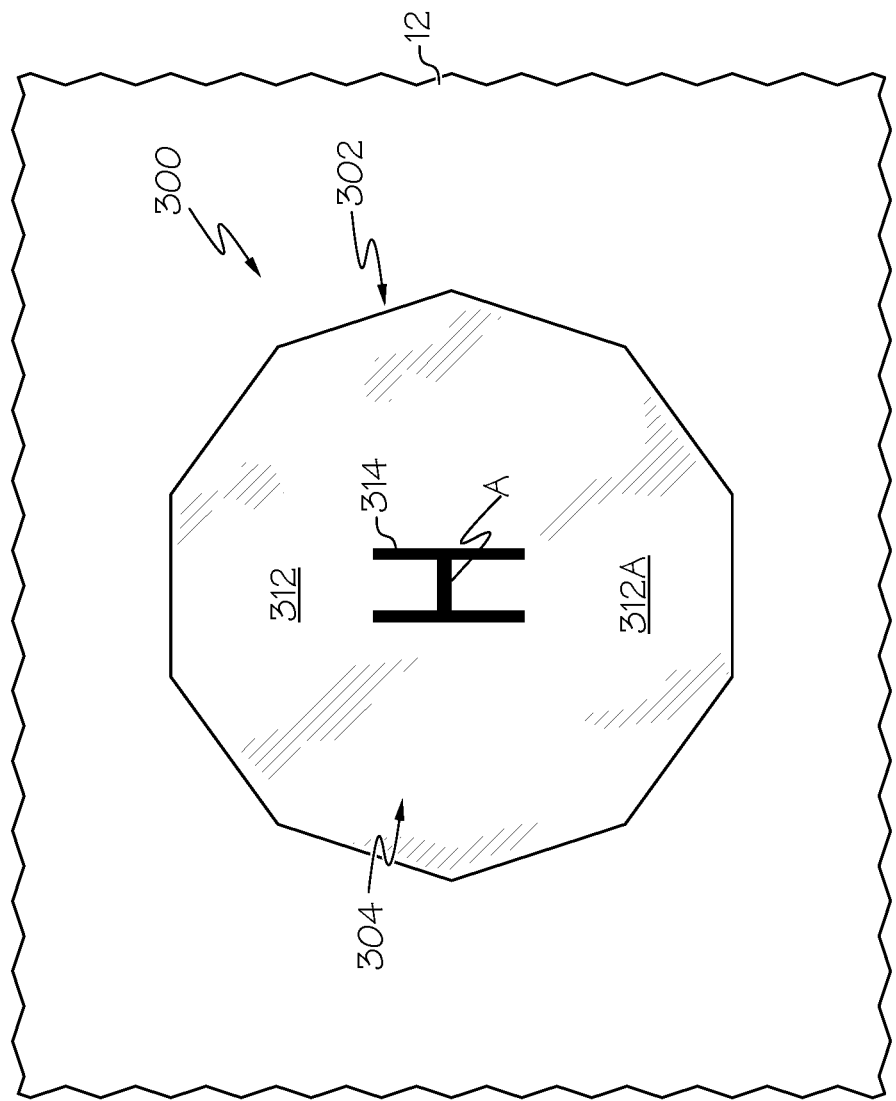
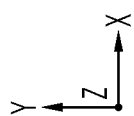
FIG. 9

DEPLOYABLE LANDING PADS FOR VERTICAL LANDING AND TAKEOFF VEHICLES AND METHODS INCORPORATING THE SAME

TECHNICAL FIELD

The present specification generally relates to landing and takeoff areas for vertical takeoff and landing vehicles, and more particularly, to landing pads that are compact, portable, and dynamically deployable from a stowed state to a deployed state.

BACKGROUND

Landing areas for vertical landing and takeoff aircrafts, such as, for example, helicopters or drones, generally occupy a predetermined space to accommodate the vertical landing and takeoff aircraft to be received thereon. Furthermore, such landing areas are relatively large in size to enhance a visibility of the landing area from its surrounding environment and for an operator of the vertical landing and takeoff aircraft to easily identify the landing area from the air. Generally, landing and takeoff areas for aircrafts are permanent structures constructed along a ground surface of a terrain, a rooftop of a building structure, and the like, and may include large insignia along the structure for purposes of facilitating an identification of the area.

In one example, a landing and takeoff area for a helicopter, commonly referred to as a helipad, may be constructed of asphalt or concrete and may include paint markings thereon, such as, for example, a letter "H" signifying the area as the helipad. A helipad may be a conspicuous structure relative to its surrounding environment by unnecessarily occupying a substantial area on a ground surface. Further, a helipad may form an aesthetically unpleasant structure in the area in which the helipad is located due to a size of the helipad and the various insignia included thereon.

Accordingly, a need exists for alternative landing structures for vertical landing and takeoff vehicles that are relatively less obtrusive and aesthetically pleasing.

SUMMARY

In one embodiment, a method of deploying a landing pad, for a vertical takeoff and landing vehicle, relative to a surface of an environment in which the landing pad is disposed, includes stowing an adjustable body of the landing pad in a stowed state. The adjustable body includes a platform surface, in the stowed state the platform surface defines a first planar surface area relative to the surface, the first planar surface area being inoperable to receive the vertical takeoff and landing vehicle thereon. The method includes deploying the adjustable body from the stowed state to a deployed state, in the deployed state the platform surface defines a second planar surface area greater than the first planar surface area, the second planar surface area of the platform surface is sized and shaped to receive the vertical takeoff and landing vehicle thereon in the deployed state.

In another embodiment, a deployable landing pad assembly for a vertical takeoff and landing vehicle includes an adjustable body that includes an adjustable platform surface, the adjustable body movable between a stowed state and a deployed state. In the stowed state the platform surface defines a first planar surface area relative to the surface, the first planar surface area being inoperable to receive the vertical takeoff and landing vehicle thereon. In the deployed state the platform surface defines a second planar surface area greater than the first planar surface area, the second surface planar area of the platform surface is sized and shaped to receive the vertical takeoff and landing vehicle thereon in the deployed state. The deployable landing pad assembly includes a deployment mechanism configured to move the adjustable body from the stowed state to the deployed state.

In another embodiment, a deployable landing pad assembly, for a vertical takeoff and landing vehicle, relative to a surface of an environment in which the landing pad is disposed, includes a garage including a frame having an opening to a garage storage area and a garage door movably coupled to the garage at the frame, the garage door having a platform surface. The deployable landing pad assembly further includes a deployment mechanism coupled to the garage door and configured to adjust the garage door from a stowed state to a deployed state. In the stowed state the platform surface of the garage door is in a vertically closed position that inhibits access to the garage storage area through the opening and such that the garage door is inoperable to receive the vertical landing and takeoff vehicle thereon. In the deployed state the platform surface of the garage door is in a horizontally opened position that permits access to the garage storage area through the opening and the platform surface is configured to receive the vertical landing and takeoff vehicle thereon.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9 schematically depicts the deployable landing pad of FIG. 7 in a deployed state according to one or more embodiments of the present disclosure;

DETAILED DESCRIPTION

Figure 1:
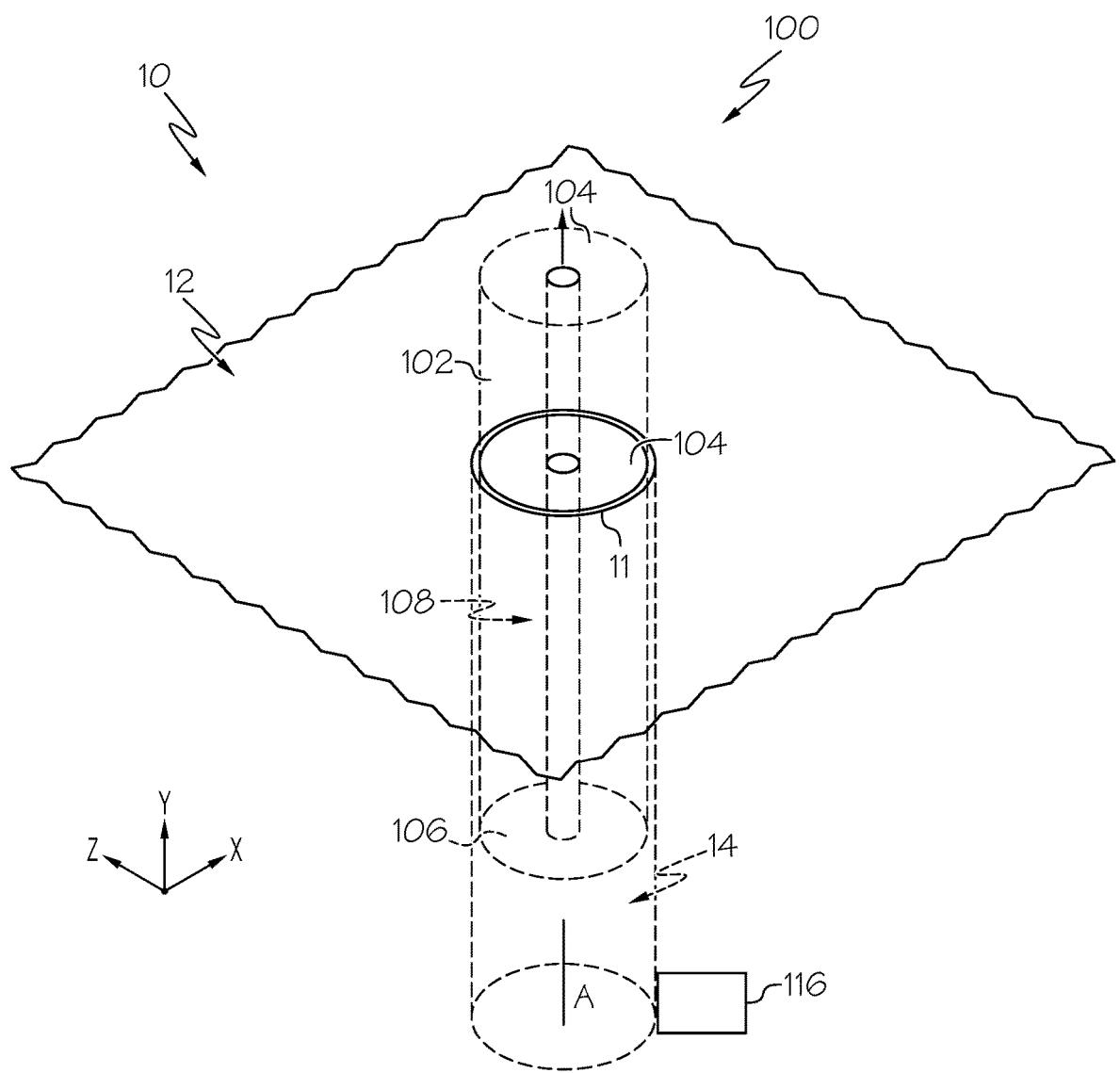
FIG. 1 schematically depicts an illustrative embodiment of a deployable landing pad relative to a ground surface in a stowed state and a first intermediate state according to one or more embodiments of the present disclosure.

Deployable landing pads for receiving vertical takeoff and landing (VTOL) vehicles (e.g., a helicopter or drone) are disclosed herein. In one embodiment, a method of deploying a landing pad, for a vertical takeoff and landing vehicle (e.g., helicopter, drone, and the like), relative to a surface of an environment in which the landing pad is disposed, includes stowing an adjustable body of the landing pad in a stowed state. The adjustable body includes a platform surface that defines a planar surface area relative to the surface of the environment in the stowed state. The first planar surface is inoperable to receive the vertical takeoff and landing vehicle thereon. The method of deploying the landing pad further includes deploying the adjustable body of the landing pad from the stowed state to a deployed state, with the platform surface in the deployed state defining a second planar surface area that is greater than the first planar surface area. The second planar surface area of the platform surface is sized and shaped to receive the vertical takeoff and landing vehicle thereon in the deployed state.

As used herein, the term vertical takeoff and landing (VTOL) vehicle may be any motorized or non-motorized vehicle, device, robotic machine, and the like without departing from the scope of the present disclosure. For example, the deployable landing pads of the present disclosure may be configured and operable to receive various VTOL vehicles thereon there, including, but not limited to, manned and unmanned VTOL vehicles such as a helicopter, a drone, a rotorcraft, an airship, an unmanned aerial vehicle (UAV), a fixed-wing aircraft, a hot air balloon, and the like.

As used herein, the term "surface" and "ground surface" refers to a plane on a surrounding environment in which a landing pad of the present disclosure is positioned. The term "deployable" refers to a dynamic modularity of one or more physical components of the present disclosure that are selectively adjustable. Further, the terms "retractable" and "collapsible" are used to describe the relative inward movement and positioning of various components of the landing pad. The terms "expandable" and "extendable" as used herein refers to the relative enlarged location and movement of the components of the landing pad relative to the retracted and/or collapsed location of said components. Because the landing pads 100, 200, 300, 400, 500 may be generally movable about a surrounding environment, the terms "internal," "inward," "interior," "disposed," "outward," "exterior," "external," "longitudinal," "lateral," "distal," "proximal" and "proximate" are relative to the one or more surfaces of the environment in which the landing pad is positioned in when evaluating the relative movement or position of components of the landing pads 100, 200, 300, 400, 500.

Further, while certain components of the landing pads 100, 200, 300, 400, 500 are described as extending in one of the identified directions, or oriented toward one of the identified directions, it should be understood that these components extend or are oriented in at least these recited directions but are not limited to such. In the embodiments described herein, the phrase "longitudinal direction" refers to the forward-rearward direction (i.e., the +/−X direction of the coordinate axes in the figures). Additionally, the phrase "vertical direction" refers to the upward-downward direction (i.e., the +/−Y direction of the coordinate axes in the figures), and the phrase "lateral direction" refers to the left-right direction (i.e., the +/−Z direction of the coordinate axes in the figures).

Referring initially to FIG. 1, a non-limiting example of a deployable landing pad 100 is depicted. In the illustrated embodiment, the deployable landing pad 100 is provided in an environment 10. In particular, the environment 10 is defined by a surface 12 having an opening 11, and a cavity 14 extending from the opening 11 so as to be disposed relatively beneath the surface 12. It should be understood that the surface 12 is an outer and/or upper layer of a physical feature of the environment 10 in which the deployable landing pad 100 may be installed in. In other embodiments the environment 10 may be a building structure, a waterbody, a roadway, a parking lot, an automotive vehicle, an aircraft, a watercraft, and the like.

The cavity 14 is sized and shaped to receive the deployable landing pad 100 therein. In the present example shown and described herein, the environment 10 is a body of land, such as a parking lot, in which the surface 12 is a ground surface of the parking lot. The cavity 14 extends downwardly from the opening 11 formed in the surface 12 such that the deployable landing pad 100 is received therein beneath the surface 12.

The deployable landing pad assembly includes a deployable landing pad 100 includes an adjustable body 102, a top end 104, a base 106, and a central shaft 108. The central shaft 108 extends between the top end 104 and the base 106 and the central shaft 108 is disposed within the adjustable body 102. The central shaft 108 has a longitudinal length substantially similar to a longitudinal length of the adjustable body 102. In other embodiments, the central shaft 108 may include a longitudinal length that is greater or smaller than a longitudinal length of the adjustable body 102. The central shaft 108 of the adjustable body 102 extends generally parallel with and/or coaxial with a central axis A. In some embodiments, the central axis A extends in the vertical direction and generally perpendicular to the surface 12.

In some embodiments, the deployable landing pad 100 includes a deployment mechanism 116 that is configured to move, and specifically translate, the deployable landing pad 100 between the stowed state, the first intermediate state, the second intermediate state, the third intermediate state, and the deployed state. The deployment mechanism 116 may include, but is not limited to, a motor, an actuator, and/or springs. In some embodiments, the motor activates the actuator, which may be coupled to control linkages used to drive the adjustable body 102, specifically, at least one of the base 106 and the central shaft 108 of the deployable landing pad 100, between the stowed state and the deployed state. The motor of the deployment mechanism 116 may be any type of motor suitable for driving the actuator, including, for example, an electric motor, a hydraulic system, pneumatic system, mechanical system and the like. The deployment mechanism 116 may be controlled by a control system (not shown) which may allow user-operated and/or automated control through a variety of measures, for example, wireless communications, radio waves, direct connection to handheld device, and the like. The actuator of the deployment mechanism 116 may include a linear actuator, such as a ball screw actuator, that is configured to convert rotational motion into linear motion. One or more springs may be utilized to assist the actuator in raising the adjustable body 102 of the deployable landing pad 100, which may minimize a corresponding size requirement of the actuator and motor thereby permitting a decrease in a depth of the cavity 14 to be required for installation of the deployable landing pad 100 therein.

Additionally or alternatively, the deployment mechanism 116 may include a manual deployment mechanism for raising and lowering the deployable landing pad 100. In some embodiments, the manual deployment mechanism includes a hand wheel, and may be utilized for instances of loss of electrical power and/or failure of one or more of the motor, actuator, springs, and/or control system. It should be understood that the configuration of the deployment mechanism 116 is not limited to the components described herein such that various drive assemblies and associated control components may be communicatively coupled to the deployable landing pad 100 without departing from the scope of the present disclosure.

As will be described in greater detail below, the deployable landing pad 100 of the present example is moveable between a stowed state shown in FIG. 1, a first intermediate state shown in dashed lines in FIG. 1, a second intermediate state shown in FIG. 2, a third intermediate state shown in dashed lines in FIG. 3, and a deployed state shown in FIG. 3. As shown in FIG. 1, the adjustable body 102 has a generally cylindrical shape when in the stowed state and the first intermediate state.

As will be described in greater detail herein, the adjustable body 102 is sized to form a landing and takeoff platform 112 having a platform surface 112A for a VTOL vehicle to be received thereon when in the deployed state. In the deployed state, the platform surface 112A has a generally planar shape that extends generally perpendicular to the central axis A of the adjustable body 102. Accordingly, it should be understood that a relative size of a VTOL vehicle to be received on the deployable landing pad 100 may be determinative of the total planar surface area of the platform surface 112A of the landing and takeoff platform 112 formed by the adjustable body 102 of the deployable landing pad 100.

For example, the adjustable body 102 of the deployable landing pad 100 may be sized to define a total planar surface area of the platform surface 112A that includes a minimum diameter that is at least 50%, 100%, 150%, or greater than an overall length of the VTOL vehicle to be received thereon or an overall length of landing gear of the VTOL vehicle. It should further be understood that the adjustable body 102 of the deployable landing pad 100 may comprise various other shapes, such as oval, rectangular, sizes, and configurations than those shown and described herein. The adjustable body 102 of the deployable landing pad 100 is formed of a material that is fabricated and configured to form a hard surface suitable for receiving and supporting a VTOL vehicle thereon. The material of the adjustable body 102 is further configured to be selectively movable to accommodate an expansion and collapse of the adjustable body 102 from a stowed state (FIG. 1) to a deployed state (FIG. 3). For example, the adjustable body 102 may be formed of a reinforced fabric material including woven and nonwoven fabrics, a metal material, such as steel, titanium, and alloys of the like.

Still referring to FIG. 1, the adjustable body 102 and the central shaft 108 of the deployable landing pad 100 are slidably received within the cavity 14 of the environment 10 such that, when in the stowed state, the top end 104 and the base 106 of the deployable landing pad 100 are received within the cavity 14. In the stowed state, the platform surface 112A extends generally parallel to the central axis A. The cavity 14 extends generally parallel with the central axis A of the central shaft 108 of the adjustable body 102. In this instance, the deployable landing pad 100 is disposed underneath the surface 12 of the environment 10 (i.e., retracted below a ground surface of the terrain). In some embodiments, with the deployable landing pad 100 in the stowed state, the top end 104 may be positioned within the opening 11 level with the surface 12 such that the top end 104 fills the opening 11 so as to form a planar surface with the surface 12.

As seen in FIG. 1, the deployable landing pad 100 is initially in the stowed state. In the stowed state, the top end 104 is positioned within the opening 11 such that the top end 104 of the adjustable body 102 is level with the surface 12 of the environment 10, the base 106 and the central shaft 108 are disposed within the cavity 14 such that the base 106 and the central shaft 108 are disposed beneath the surface 12 of the environment 10. As the top end 104 of the adjustable body 102 is positioned within the opening 11 so as to be level with the surface 12, the deployable landing pad 100 is unobtrusive to the environment 10.

In some embodiments, the top end 104 of the adjustable body 102 is disposed beneath the surface 12 of the environment 10 in the stowed state such that the top end 104 is retracted below a ground surface of the terrain. Upon actuation of the control system, the deployment mechanism 116 operates to move the deployable landing pad 100 from the stowed state to a first intermediate state shown in dashed lines in FIG. 1. Specifically, the deployment mechanism 116 operates to raise the central shaft 108 and the adjustable body 102 into the first intermediate state.

In the first intermediate state, the top end 104 of the adjustable body 102 is positioned a predetermined distance above the surface 12 of the environment 10. Further, in the first intermediate state, a portion of the adjustable body 102 and a portion of the central shaft 108 are positioned within the cavity 14. In the first intermediate state, the deployable landing pad 100 is configured to operate as a physical barrier to prevent vehicles and/or pedestrians from passing over the deployable landing pad 100. In some embodiments, the deployable landing pad 100 is configured to operate as both a physical barrier for vehicles and/or pedestrians when in the first intermediate state, and as a landing pad for VTOL vehicles when in the deployed state. In the first intermediate state, the platform surface 112A extends generally parallel to the central axis A.

Figure 2:
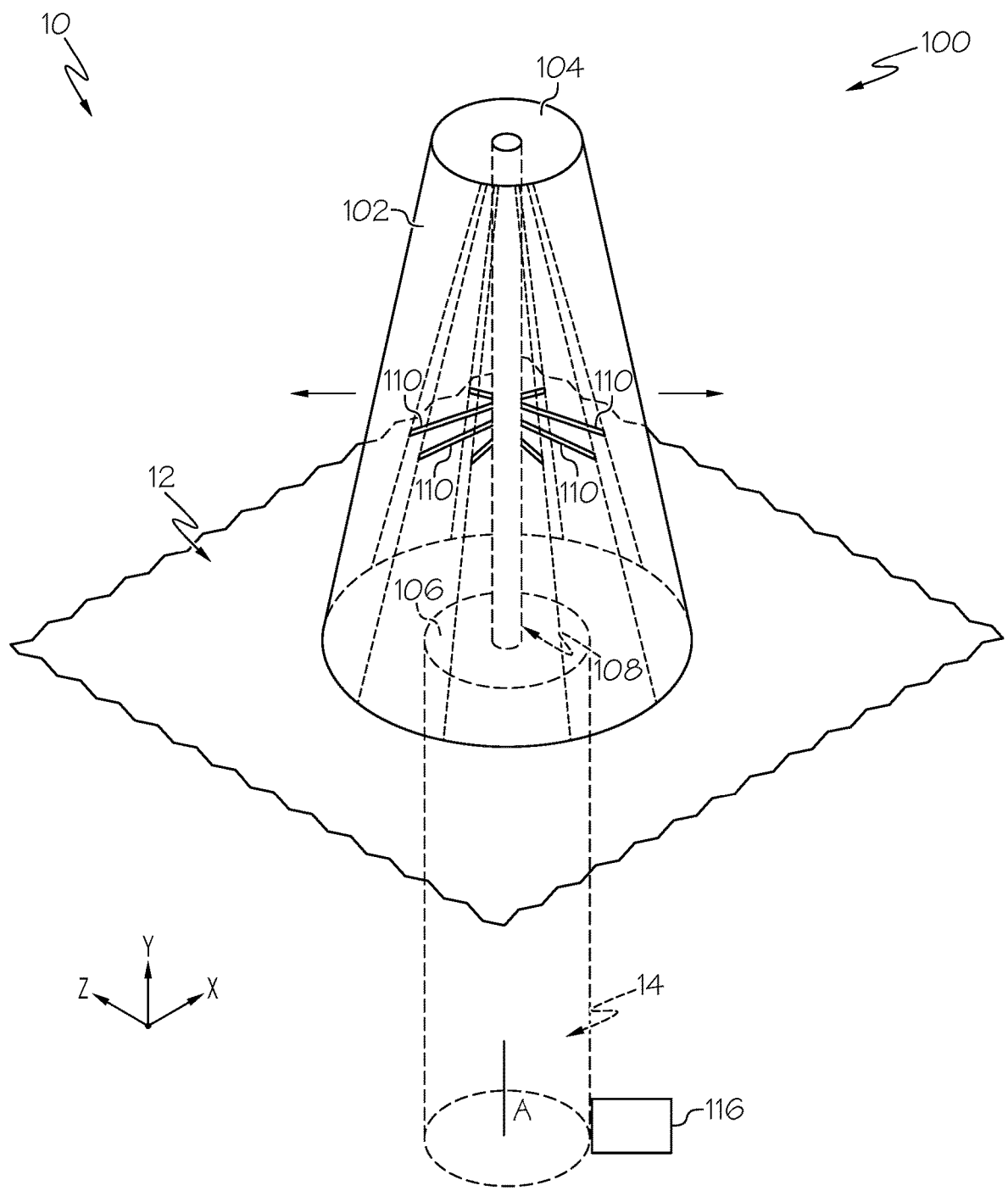
FIG. 2 schematically depicts the deployable landing pad of FIG. 1 in a second intermediate state according to one or more embodiments of the present disclosure.

Referring to FIG. 2, the central shaft 108 of the deployable landing pad 100 is coupled to the adjustable body 102 by a plurality of beams 110 disposed between the adjustable body 102 and the central shaft 108. In particular, each beam 110 of the plurality of beams 110 is attached to the central shaft 108 and an inner surface of the adjustable body 102, such that the plurality of beams 110 extend between the central shaft 108 and the inner surface of the adjustable body 102. Further, each beam 110 of the plurality of beams 110 is movably coupled to the central shaft 108 such that the plurality of beams 110 is translatable along a longitudinal length of the central shaft 108. The plurality of beams 110 are moveable between a compacted position and an extended position. The plurality of beams 110 are in the compacted position when the adjustable body 102 is in the stowed state and the first intermediate state. The plurality of beams 110 move from the compacted position towards the extended position as the adjustable body 102 moves from the first intermediate position towards the second intermediate position, and the plurality of beams 110 are in the expanded position when the adjustable body 102 is in the third intermediate position and the deployed position.

Accordingly, a linear translation of the plurality of beams 110 along a longitudinal length of the central shaft 108 and toward the top end 104 may provide an outward extension of an opposite end of the beams 110 coupled to the inner surface of the adjustable body 102. Specifically, the continued operation of the deployment mechanism 116 moves the deployable landing pad 100 from the first intermediate state shown in dashed lines in FIG. 1 into the second intermediate state shown in FIG. 2. In the second intermediate state, the deployment mechanism 116 operates to raise the top end 104 of the adjustable body 102 further above the surface 12 such that a lower end of the adjustable body 102 is positioned above the opening 11. Further, the deployment mechanism 116 operates to provide the linear translation of the plurality of beams 110 along a longitudinal length of the central shaft 108 and toward the top end 104 such that an outward extension of an opposite end of the beams 110 coupled to the inner surface of the adjustable body 102 provides an outward force applied against an inner surface of the adjustable body 102 to move the adjustable body 102 radially outward from the central shaft 108. In the second intermediate state, the platform surface 112A extends generally obliquely to the central axis A.

Figure 3:
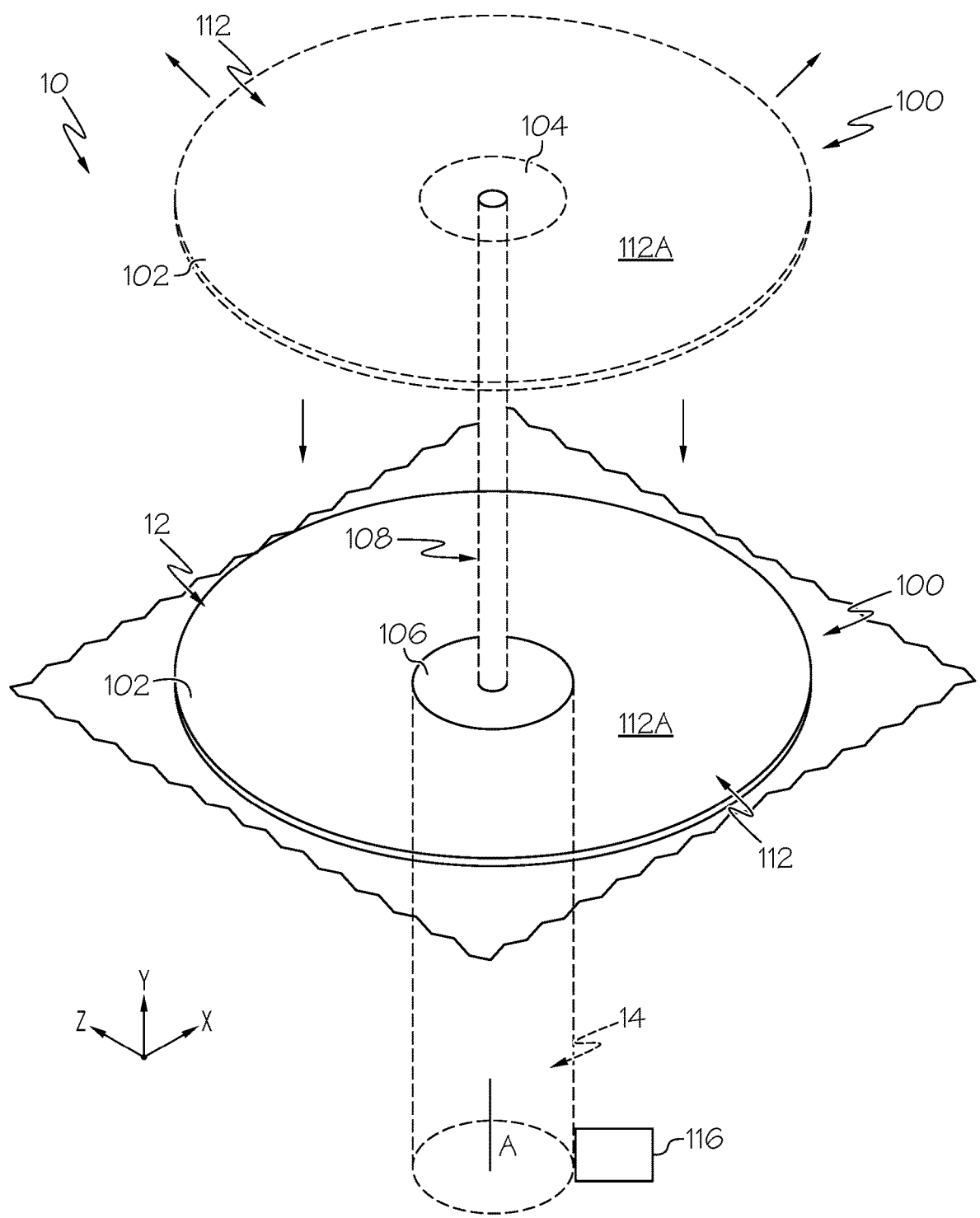
FIG. 3 schematically depicts the deployable landing pad of FIG. 1 in a third intermediate state and a deployed state according to one or more embodiments of the present disclosure.

Referring now to FIG. 3, continued operation of the deployment mechanism 116 moves the deployable landing pad 100 into the third intermediate state shown in dashed lines. In the third intermediate state, the deployable landing pad 100 is depicted with the adjustable body 102 forming a platform 112 having a platform surface 112A that is elevated relative to the surface 12 of the environment 10. In other words, the adjustable body 102 is expanded outwardly relative to the central shaft 108, thereby forming the platform 112 that is parallel to the surface 12 of the environment 10. The adjustable body 102 is maintained in the expanded configuration (i.e., the third intermediate state) by a position of the plurality of beams 110 translated along a longitudinal length of the central shaft 108 adjacent to the top end 104. A size, and in particular a radius, of the platform 112 formed by the adjustable body 102 is equivalent to a longitudinal length of the adjustable body 102. In the third intermediate state, the platform surface 112A extends generally perpendicular to the central axis A.

Still referring to FIG. 3, continued operation of the deployment mechanism 116 operates to move the deployable landing pad 100 from the third intermediate state to the deployed state. Specifically, as the deployable landing pad 100 moves from the third intermediate state to the deployed state, the central shaft 108 and the top end 104 translate toward the surface 12 and the base 106 translates into the cavity 14 while the adjustable body 102 remains radially extended from the central shaft 108, thereby lowering an elevation of the platform 112. In the deployed state, the platform 112 may be provided on the surface 12 so as to support the VTOL vehicle thereon. In the deployed state, the platform surface 112A extends generally perpendicular to the central axis A and includes a planar surface area that is greater than a planar surface area of the platform surface 112A when in the stowed state, the first intermediate state, and the second intermediate state.

Upon concluding use of the platform 112 for purposes of receiving a VTOL vehicle thereon, the deployable landing pad 100 may be transitioned from the deployed state to the stowed state by actuating the deployment mechanism 116 to translate the plurality of beams 110 downwardly along a longitudinal length of the central shaft 108. In this instance an outward force applied by the plurality of beams 110 against an inner surface of the adjustable body 102 is removed until the adjustable body 102 returns to the stowed state.

As described in greater detail herein, the platform 112 formed by the adjustable body 102 is suitable for serving as a landing and takeoff pad for a VTOL vehicle. Although not shown, it should be understood that in some embodiments the platform 112 of the deployable landing pad 100 may include one or more markings, labels, insignia, and/or the like. For example, as shown in FIG. 9, the platform 112 may include markings indicative of a helipad location, such as a letter "H" positioned along a surface of the platform 112.

Figure 4:
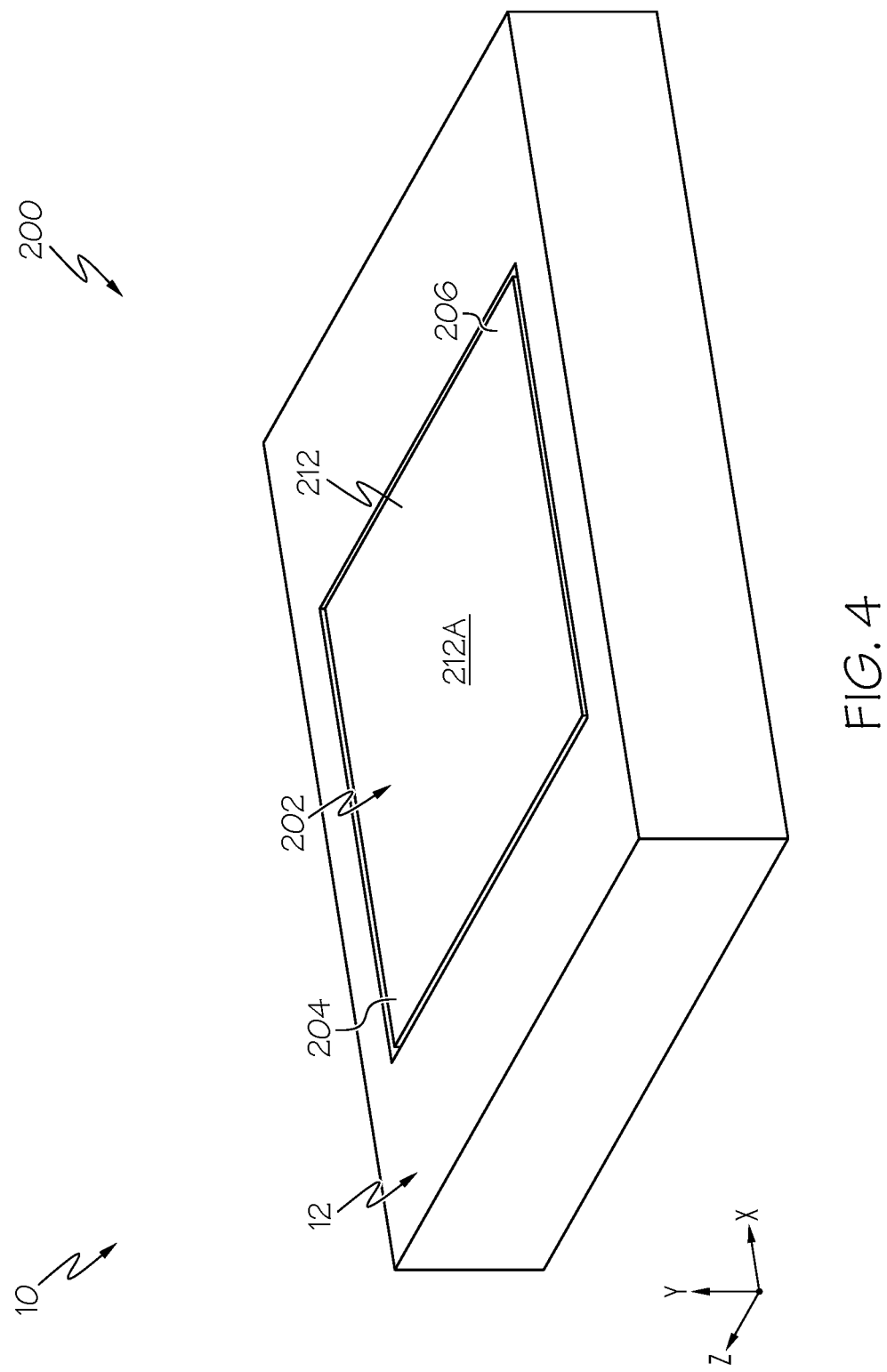
FIG. 4 schematically depicts another illustrative embodiment of a deployable landing pad relative to a ground surface in a stowed state according to one or more embodiments of the present disclosure.
Figure 5:
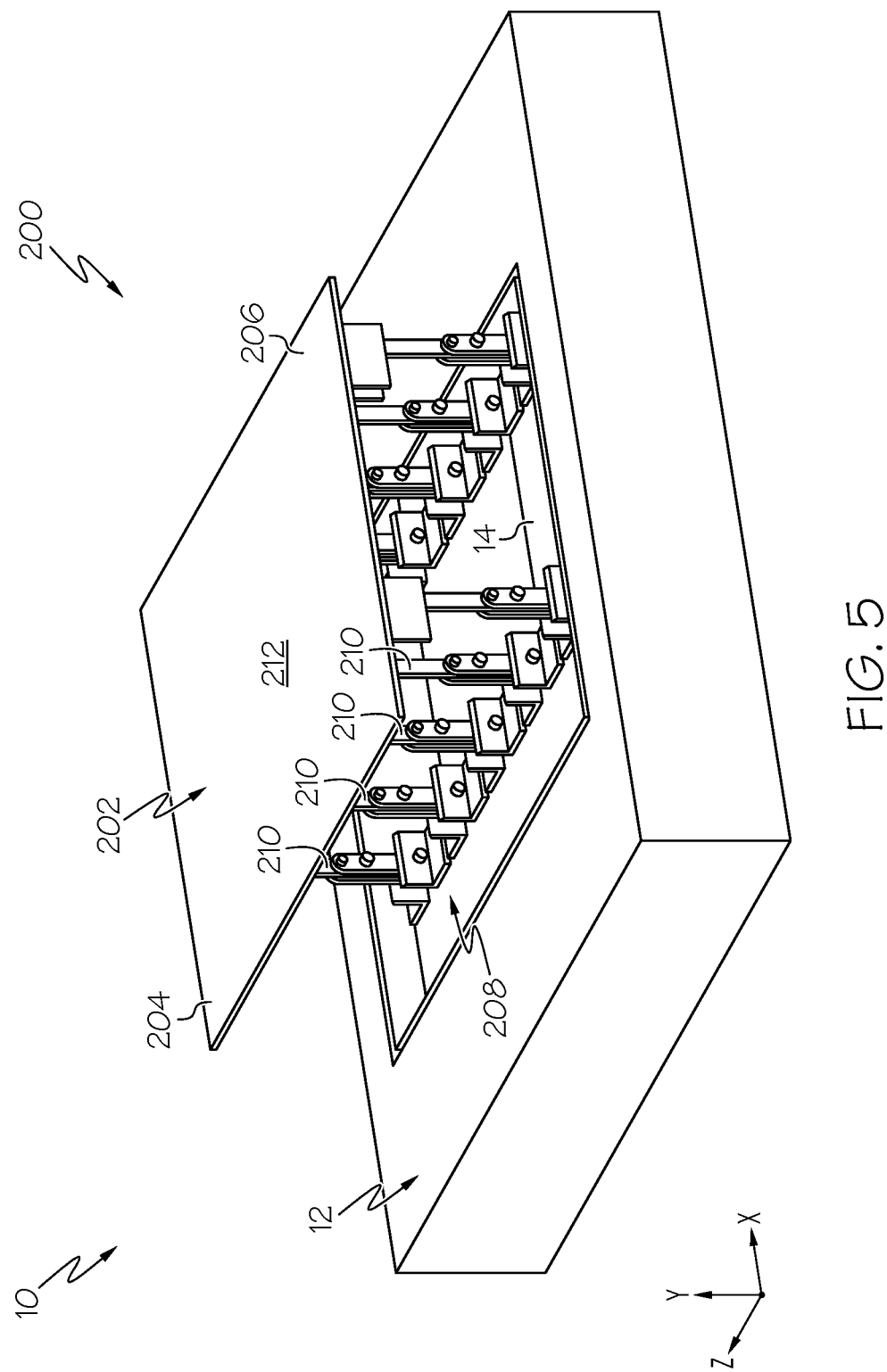
FIG. 5 schematically depicts the deployable landing pad of FIG. 4 in a deployed state according to one or more embodiments of the present disclosure.

Referring now to FIGS. 4-5, a non-limiting example of another deployable landing pad assembly that includes a deployable landing pad 200 is depicted. In the illustrated embodiment, the deployable landing pad 200 is provided in the environment 10. In the example shown, the environment 10 is substantially similar to the environment shown and described above such that like reference numerals are used to identify like components. However, it should be understood that the deployable landing pad 200 of the present example may be included along various other environments, such as, for example, on a roadway, a building structure, an aircraft, a watercraft, an automotive vehicle, a waterbody, a parking lot, and the like.

As best seen in FIG. 4, the deployable landing pad 200 includes an adjustable body 202, a front end 204, and an opposite rear end 206. The adjustable body 202 extends between the front end 204 and the rear end 206. The adjustable body 202 of the present example defines a platform 212 having a planar platform surface 212A having a longitudinal length defined by the front end 204 and the rear end 206 of the deployable landing pad 200. A size, and in particular a surface area, of the adjustable body 202 is predetermined based on a total planar area of the planar platform surface 212A to be formed by the adjustable body 202.

As will be described in greater detail herein, the adjustable body 202 is sized to form a landing and takeoff platform 212 having a platform surface 212A for a VTOL vehicle to be received thereon. Accordingly, it should be understood that a relative size of a VTOL vehicle to be received on the deployable landing pad 200 may be determinative of the total planar area of the landing and takeoff platform 212 formed by the adjustable body 202 of the deployable landing pad 200. As will further be described in greater detail below, the deployable landing pad 200 of the present example is movable between a stowed state shown in FIG. 4 and a deployed state shown in FIG. 5. In some embodiments, the deployable landing pad 200 may be further movable to an intermediate state (not shown) as further described herein.

For example, the adjustable body 202 of the deployable landing pad 200 may be sized to define a total planar surface area of the platform surface 212A that includes a minimum surface area that is at least 50%, 100%, 150%, or greater than an overall length of the VTOL vehicle (e.g., helicopter, drone, and the like) to be received thereon or an overall length of the landing gear of the VTOL vehicle. It should further be understood that the adjustable body 202 of the deployable landing pad 200 may comprise various other shapes, such as oval or rectangular, sizes, and configurations than those shown and described herein. The adjustable body 202 of the deployable landing pad 200 is formed of a material that is fabricated and configured to form a hard surface suitable for receiving a VTOL vehicle thereon. For example, the adjustable body 202 may be formed of a concrete, a metal, such as steel, titanium, and alloys of the like. In other embodiments where the deployable landing pad 200 is positioned within a roadway environment that routinely receives objects having a relatively large weight thereon (e.g., automotive vehicles), the adjustable body 202 may be formed of a material composition that is capable of sustaining the loads applied thereon by the objects. It should be understood that the front end 204 and the rear end 206 are equally interchangeable such that either end 204, 206 of the deployable landing pad 200 may be deemed a front and/or rear end of the adjustable body 202. Accordingly, use of the terms "front" and "rear" should not be construed as limiting the respective configuration of the deployable landing pad 200 as a front or rear of the apparatus shown and described herein.

Referring now to FIG. 5, the deployable landing pad 200 is coupled to a deployment mechanism 208 positioned within the cavity 14 of the environment 10. The deployment mechanism 208 is configured to move, and in particular lift, the front end 204 and the rear end 206 of the deployable landing pad 200 from the stowed state (FIG. 4) to a deployed state (FIG. 5). It should be understood that with the front end 204 and the rear end 206 transitioned to the deployed state, the deployable landing pad 200 is effectively moved from a retracted position (FIG. 4) to an extended position (FIG. 5).

In some embodiments, the deployment mechanism 208 may be configured to individually and/or separately move one of the front end 204 or the rear end 206 prior to moving the opposing end such that the deployable landing pad 200 transitions to an intermediate state before fully extending to a deployed state. In this instance, the deployable landing pad 200 may closely resemble a wedge barricade with the platform surface 212A of the adjustable body 202 being angled relative to surface 12 of the environment 10. In embodiments where the deployable landing pad 200 may positioned within a roadway and/or parking lot environment 10, the deploying landing pad 200 may further serve as a vehicle barricade such that the deployable landing pad 200 may be configured to inhibit vehicles from accessing the environment 10 when in the intermediate state. Further, in embodiments where the deployable landing pad 200 may be positioned may be positioned along a walkway and/or sidewalk environment 10, the deployable landing pad 200 may serve as a pedestrian barricade to inhibit individuals from accessing the environment 10 when in the intermediate state.

According to one embodiment, the deployment mechanism 208 may include, but is not limited to, a motor, an actuator, and a plurality of linkages 210. In the present example, the motor activates the actuator, which may be coupled to the plurality of linkages 210 used to raise the adjustable body 202 of the deployable landing pad 200 from the stowed state (FIG. 4) to the deployed state (FIG. 5).

The motor of the deployment mechanism 208 may be any type of motor suitable for driving the actuator, including, for example, an electric motor, a hydraulic system, a pneumatic system, mechanical system and the like. The deployment mechanism 208 may be controlled by a control system (not shown) which may allow user-operated and/or automated control through a variety of measures, for example, wireless communications, radio waves, direct connection to handheld device, and the like. The actuator of the deployment mechanism may include a linear actuator, such as a ball screw actuator, that is configured to convert rotational motion into linear motion. The plurality of linkages 210 are positioned within the cavity 14 of the environment 10 and are coupled to the front end 204 and the rear end 206 of the adjustable body 202. The plurality of linkages 210 assist the actuator in raising the adjustable body 202 of the deployable landing pad 200, which minimizes a corresponding size requirement of the actuator and motor permitting a shallower cavity 14 to be required for installation of the deployable landing pad 200 therein.

The plurality of linkages 210 are selectively collapsible such that the linkages 210 may fold within the cavity 14 of the environment 10 when the deployable landing pad 200 is in the stowed state. In other words, the plurality of linkages 210 are fully disposed within the cavity 14 of the environment 10 when the deployable landing pad 200 is in the stowed state and the adjustable body 202, the front end 204, and the rear end 206 are positioned level with the surface 12 of the environment 10. The plurality of linkages 210 may extend outwardly from the cavity 14 to raise the adjustable body 202, the front end 204, and the rear end 206 to an extended position, thereby transitioning the deployable landing pad 200 to the deployed state.

A manual operation mechanism may be further included and coupled to the deployable landing pad 200 for raising and lowering the deployable landing pad 200. It should be understood that the configuration of the deployment mechanism 208 and/or the manual operation mechanism is not limited to the components described herein such that various drive assemblies and associated control components may be communicatively coupled to the deployable landing pad 200 without departing from the scope of the present disclosure.

As seen in FIG. 4, the deployable landing pad 200 is initially positioned in the stowed state. In the stowed state, the adjustable body 202 is level along the surface 12 of the environment 10 such that the front end 204 and the rear end 206 of the deployable landing pad 200 are level with the surface 12. In this instance, the platform surface 212A of the deployable landing pad 200 is positioned parallel to and flush with the surface 12 of the environment 10 (e.g., a ground surface of the terrain). In other embodiments, the adjustable body 202, the front end 204, and/or the rear end 206 may be positioned relatively below or above the surface 12 when the deployable landing pad 200 is in the stowed state (e.g., fully retracted position) such that at least a portion of the deployable landing pad 200 is offset from the surface 12.

Upon actuation of the control system, the deployment mechanism 208 operates to move the deployable landing pad 200 from the stowed state to the deployed state. Specifically, the deployment mechanism 208 operates to raise the front end 204 and the rear end 206 to an extended position where the deployable landing pad 200 transitions toward a deployed state. In the deployed state, the adjustable body 202 is positioned a predetermined distance above the surface 12 of the environment 10. In the present example, the motor activates the actuator, which may be coupled to the plurality of linkages 210 used to raise the adjustable body 202 of the deployable landing pad 200 from the stowed state (FIG. 4) to the deployed state (FIG. 5).

Specifically, the continued operation of the deployment mechanism 208 moves the deployable landing pad 200 from the stowed state shown in FIG. 4 to the deployed state shown in FIG. 5 by translating the plurality of linkages 210 outwardly from a collapsed configuration to an extended configuration such that the plurality of linkages 210 extends relatively upward from the cavity 14 and above the surface 12. The plurality of linkages 210 apply an outward force onto an inner surface of the adjustable body 202, along which the plurality of linkages 210 are coupled to, to raise the deployable landing pad 200 to the deployed state. Accordingly, upon actuation of the deployment mechanism 208 the deployable landing pad 200 extends outwardly and the adjustable body 202, the front end 204, and rear end 206 rise above the surface 12.

In the deployed state, the deployable landing pad 200 is configured to operate as a physical barrier to prevent vehicles and/or pedestrians from passing over the deployable landing pad 200. In some embodiments, the deployable landing pad 200 is configured to operate as both a physical barrier for vehicles and/or pedestrians when in the deployed state, and as a landing pad for VTOL vehicles when in the deployed state.

With the plurality of linkages 210 translated outward and the front end 204 and the rear end 206 expanded, the adjustable body 202 is positioned parallel to and above the surface 12 of the environment 10. The platform 212 may be elevated relative to the surface 12 of the environment 10 at a maximum height that is substantially equivalent to a longitudinal length of the plurality of linkages 210. It should be understood that in some embodiments the adjustable body 202, the front end 204, and the rear end 206 may extend above the surface 12 of the environment 10 at varying heights such that the deployable landing pad 200 may be positioned at a desired vertical offset relative to the environment 10 depending on an actuation of the deployment mechanism 208. For example, a height of the adjustable body 202 of the deployable landing pad 200 relative to the surface 12 of the environment 10 may be adjusted (e.g., raised or lowered) by selectively actuating the deployment mechanism 208 to control a degree of extension of the plurality of linkages 210 from the cavity 14.

Upon concluding use of the platform 212 for purposes of receiving a VTOL vehicle thereon, the deployable landing pad 200 may be transitioned from the deployed state to a stowed state (FIG. 4) and/or intermediate state (not shown) by translating the plurality of linkages 210 relatively downward into the cavity 14. In this instance, an outward force applied against an inner surface of the adjustable body 202 by the plurality of linkages 210 is removed and the adjustable body 202, the front end 204, and the rear end 206 are effectively lowered toward the surface 12 until the deployable landing pad 200 returns to the stowed state. In this instance, the deployment mechanism 208, and in particular the plurality of linkages 210, are positioned beneath the surface 12 and within the cavity 14. In some embodiments the adjustable body 202, the front end 204, and the rear end 206 may be positioned above and/or below a surface level of the surface 12 when the deployable landing pad 200 is in the stowed state.

As described in greater detail herein, the platform 212 formed by the adjustable body 202 is suitable for serving as a landing and takeoff pad for a VTOL vehicle. Although not shown, it should be understood that in some embodiments the platform 212 of the deployable landing pad 200 may include one or more markings, labels, insignia, and/or the like. For example, the platform 212 may include markings indicative of a helipad location, as shown in FIG. 9, such as a letter "H" positioned along a surface of the platform 212.

Figure 6:
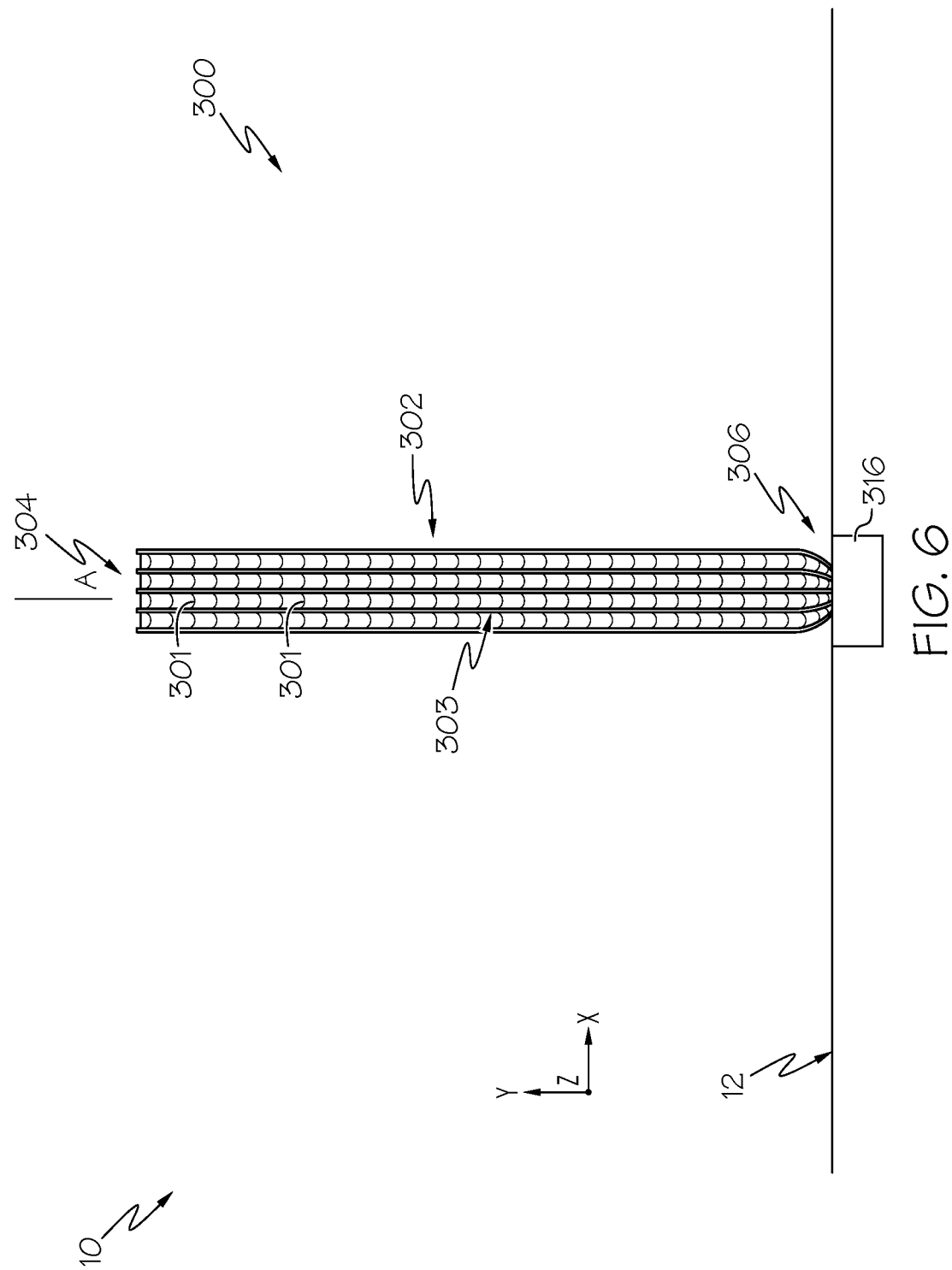
FIG. 6 schematically depicts another illustrative embodiment of a deployable landing pad relative to a ground surface in a stowed state according to one or more embodiments of the present disclosure.

Referring now to FIGS. 6-9, a non-limiting example of another deployable landing pad assembly that includes a deployable landing pad 300 is depicted. In the illustrated embodiment, the deployable landing pad 300 is provided in the environment 10. In the example shown, the environment 10 is substantially similar to the environment 10 shown and described above such that like reference numerals are used to identify like components. However, it should be understood that the deployable landing pad 300 of the present example may be included along various other environments, such as, for example, a roadway, building structure, aircraft, watercraft, automotive vehicle, waterbody, and the like. As best seen in FIG. 6, the deployable landing pad 300 includes an adjustable body 302, a top end 304, and a base 306. The adjustable body 302 extends between the top end 304 and the base 306 such that the adjustable body 302 includes a longitudinal length defined by the top end 304 and the base 306 of the deployable landing pad 300.

The adjustable body 302 includes a central axis A that extends generally perpendicular to the surface 12. In some embodiments, the central axis A extends in the vertical direction and generally perpendicular to the surface 12. The adjustable body 302 of the present example defines an elongated and/or cylindrically-shaped body that extends generally parallel or coaxial with the central axis A when in the stowed state. As will be described in greater detail herein, the adjustable body 302 is sized to form a landing and takeoff platform 312 having a platform surface 312A for a VTOL vehicle when in the deployed state. A size, and in particular a longitudinal length, of the cylindrically-shaped adjustable body 302 is predetermined based on a total planar surface area of the platform surface 312A to be formed by the adjustable body 302 when in a deployed state (FIG. 9). Accordingly, it should be understood that a relative size of a VTOL vehicle to be received on the deployable landing pad 300 may be determinative of the total planar area of the platform surface 312A of the landing and takeoff platform 312 formed by the adjustable body 302 of the deployable landing pad 300 (e.g., at least 50%, 100%, 150%, or greater than of an overall length of a VTOL vehicle).

In the present example, the adjustable body 302 includes a decorative design 301 positioned along an outer surface 303 of the adjustable body 302. The decorative design 301 of the deployable landing pad 300 may comprise various patterns, shapes, and configurations. The decorative design 301 is operable to provide an aesthetically pleasing display along the adjustable body 302 for observation by occupants within the environment 10 when the deployable landing 300 is in the stowed state. In some embodiments, the decorative design 301 may comprise artwork, an advertisement, an informational screen, and the like. It should be understood that the decorative design 301 serves to improve a visual appearance of the deployable landing pad 300 within the environment 10. Furthermore, in some embodiments the decorative design 301 may be a static display (e.g., printed artwork, advertisement, information, and the like), while in other embodiments the decorative design 301 may be a dynamic display (e.g., electrical screen displaying artwork, advertisement, information, and the like). It should further be understood that the adjustable body 302 of the deployable landing pad 300 may comprise various other shapes, sizes, and configurations than those shown and described herein. For example, the adjustable body 302 may comprise an irregularly-shaped body that emulates an artistic configuration or profile, statue, sculpture, artistic figure, or advertisement platform, when the deployable landing pad 300 is in the stowed state. In such an embodiment, the adjustable body 302 is moveable between a first configuration, such as artistic configuration or profile, statue, sculpture, artistic figure, or advertisement platform to a second configuration such as at least one of the deployed state, first intermediate state, and second intermediate state.

The adjustable body 302 of the deployable landing pad 300 is formed of a material that is fabricated and configured to form a hard surface suitable for receiving and supporting a VTOL vehicle thereon. As will be described in greater detail herein, the deployable landing pad 300 of the present example is movable between a stowed state shown in FIG. 6, a first intermediate state shown in FIG. 7, a second intermediate state shown in FIG. 8, and a deployed state shown in FIG. 9.

The material of the adjustable body 302 is further configured to be selectively movable to accommodate an expansion and collapse of the adjustable body 302 from a stowed state (FIG. 6) to a deployed state (FIG. 9). For example, the adjustable body 302 may be formed of a reinforced fabric material including woven and nonwoven fabrics, a metal material, such as steel, titanium, and alloys of the like. Alternatively, the adjustable body 302 of the deployable landing pad 300 may be formed of a material that is fabricated and configured to form a relatively softer surface than that described above. As will be described in greater detail herein, the adjustable body 302 of the deployable landing pad 300 may be positioned against the surface 12 of the environment 10 when in a deployed state (FIG. 9) such that the surface 12 may provide structural support for the adjustable body 302, thereby enhancing a rigidity of the adjustable body 302. Accordingly, the adjustable body 302 may be composed of various other materials that are not particularly configured to form a hard surface.

Still referring to FIG. 6, the base 306 of the deployable landing pad 300 is positioned level along the surface 12 of the environment 10 such that the top end 304 is elevated from the surface 12 by a longitudinal length of the adjustable body 302 disposed therebetween. In this instance, the deployable landing pad 300 is positioned above the surface 12 of the environment 10 when in a stowed state. In other embodiments one or more of the adjustable body 302, the top end 304, and/or the base 306 may be positioned relatively below the surface 12 of the environment 10 (e.g., within a cavity 14) when in the stowed state. In the present example, the deployable landing pad 300 is coupled to a deployment mechanism 316 that is configured to move, and specifically expand, the deployable landing pad 300 from the stowed state, to the first intermediate state (FIG. 7), the second intermediate state (FIG. 8), and the deployed state (FIG. 9). In some embodiments, the deployment mechanism 316 may be provided beneath the surface 12.

According to one embodiment, the deployment mechanism 316 may include, but is not limited to, a motor, an actuator, and springs. In this instance, the motor activates the actuator, which may be coupled to control linkages used to drive the adjustable body 302 of the deployable landing pad 300 from the stowed state to the deployed state. The motor of the deployment mechanism 316 may be any type of motor suitable for driving the actuator, including, for example, an electric motor, a hydraulic system, pneumatic system, mechanical system and the like. The deployment mechanism 316 may be controlled by a control system (not shown) which may allow user-operated and/or automated control through a variety of measures, for example, wireless communications, radio waves, direct connection to handheld device, and the like.

The actuator of the deployment mechanism 316 may include a linear actuator, such as a ball screw actuator, that is configured to convert rotational motion into linear motion. One or more springs may be utilized to assist the actuator in expanding the adjustable body 302 of the deployable landing pad 300 laterally outward. A manual deployment mechanism for expanding and retracting the deployable landing pad 300 may be further provided. It should be understood that the configuration of the deployment mechanism 316 and/or the manual deployment mechanism is not limited to the components described herein and various drive assemblies and associated control components may be communicatively coupled to the deployable landing pad 300 without departing from the scope of the present disclosure.

As seen in FIG. 6, the deployable landing pad 300 is initially in the stowed state in which the platform surface 312A extends generally parallel with the central axis A. In the stowed state, the base 306 is positioned flush along the surface 12 of the environment 10 with the top end 304 positioned relatively above the base 306. The decorative design 301 along the outer surface 303 of the adjustable body 302 is visible from the environment 10. Upon actuation of a control system, the deployment mechanism 316 operates to move the deployable landing pad 300 from the stowed state to a first intermediate state. Specifically, the deployment mechanism 316 operates to expand the adjustable body 302 toward the surface 12.

Figure 7:
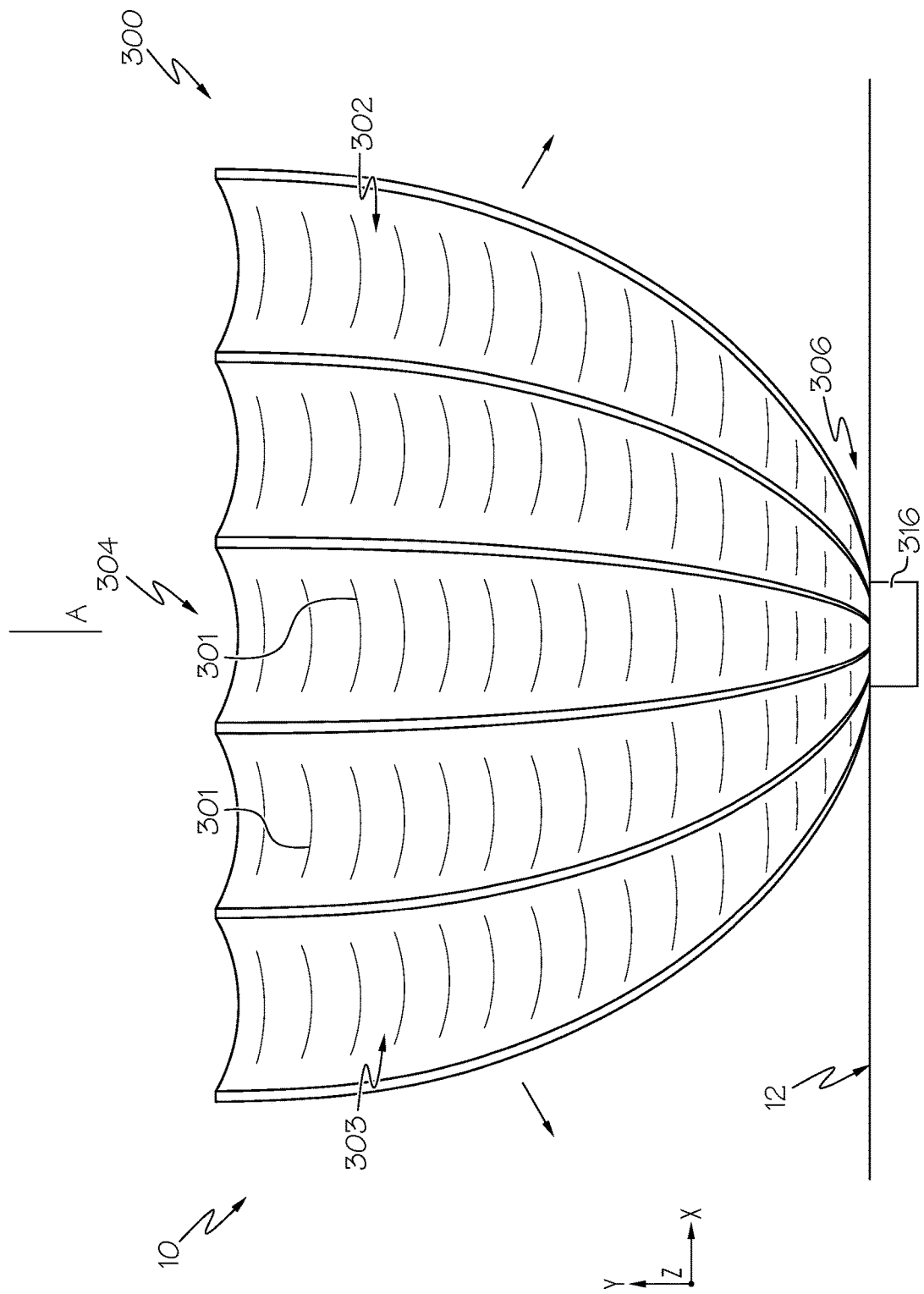
FIG. 7 schematically depicts the deployable landing pad of FIG. 6 in a first intermediate state according to one or more embodiments of the present disclosure.

Referring now to FIG. 7, the deployable landing pad 300 is depicted in a first intermediate state with the adjustable body 302 extending laterally outward relative to an orientation of the adjustable body 302 in the stowed state (FIG. 6). In particular, the top end 304 of the deployable landing 300 extends laterally outward relative to the base 306, and adjacent the surface 12 of the environment 10 relative to a position of the top end 304 of the deployable landing pad 300 in the stowed state. It should be understood that the base 306 of the deployable landing pad 300 is fixedly secured to the surface 12 of the environment 10 such that a position of the base 306 remains fixed as the top end 304 of the deployable landing pad 300 moves. In this instance, the decorative design 301 along the outer surface 303 of the adjustable body 302 simultaneously extends laterally outward relative to the base 306, and relatively downward toward the surface 12 of the environment 10 as compared to a position of the outer surface 303 of the deployable landing pad 300 in the stowed state. In the first intermediate state, the platform surface 312A extends generally obliquely to the central axis A.

Figure 8:
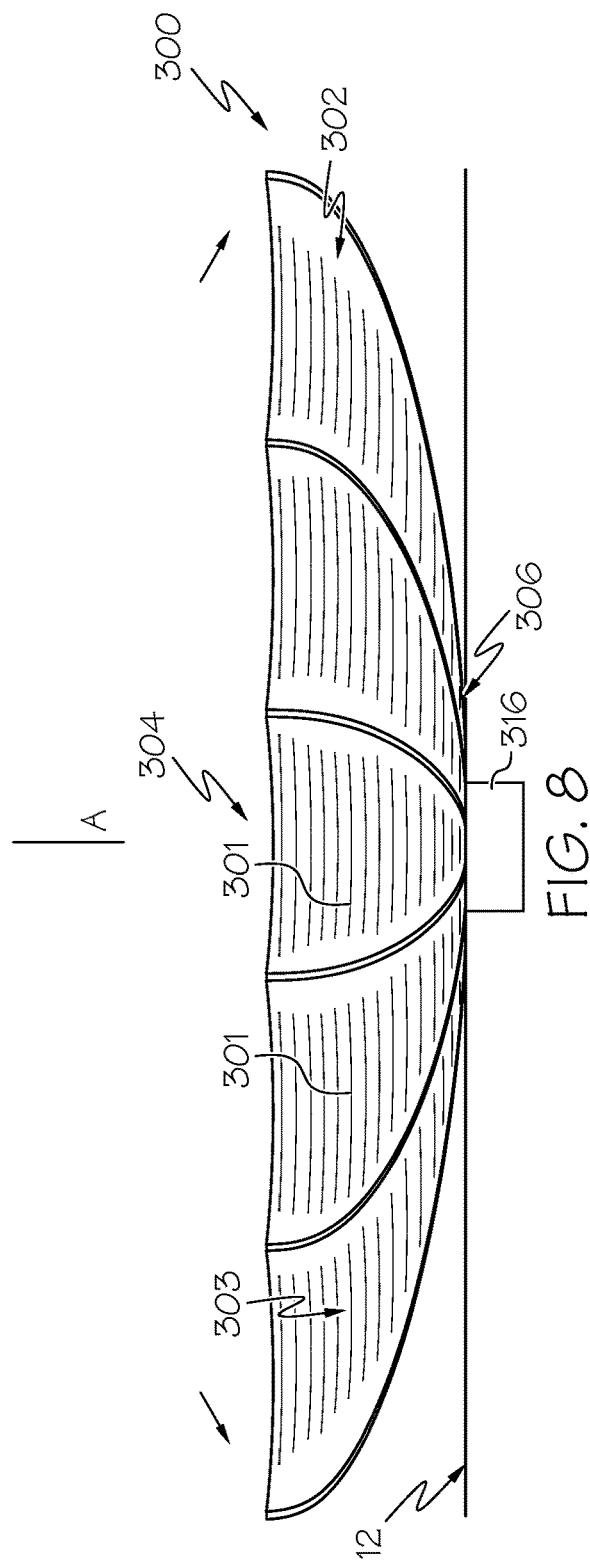
FIG. 8 schematically depicts the deployable landing pad of FIG. 6 in a second intermediate state according to one or more embodiments of the present disclosure.

The continued operation of the deployment mechanism 316 moves the deployable landing pad 300 from the first intermediate state shown in FIG. 7 to the second intermediate state shown in FIG. 8.

Referring to FIG. 8, the adjustable body 302 of the deployable landing pad 300 is depicted in the second intermediate state with the adjustable body 302 extending laterally outward relative to an orientation of the adjustable body 302 in the first intermediate state of FIG. 7. In this instance, the adjustable body 302 of the deployable landing pad 300 is further enlarged as compared to an orientation of the adjustable body 302 of the deployable landing pad 300 when in the stowed state (FIG. 6) and the first intermediate state (FIG. 7). The outer surface 303 of the adjustable landing pad 300 is positioned proximate to the surface 12 of the environment 10 such that the outer surface 303 is disposed over the surface 12. In this instance, the decorative design 301 of the adjustable body 302 simultaneously extends proximate to the surface 12 of the environment 10 as compared to a position of the decorative design 301 of the deployable landing pad 300 when in the first intermediate state of FIG. 7. In the second intermediate state, the platform surface 312A extends generally obliquely to the central axis A.

The continued operation of the deployment mechanism 316 moves the deployable landing pad 300 from the second intermediate state shown in FIG. 8 to the deployed state shown in FIG. 9.

Referring now to FIG. 9, the deployable landing pad 300 is depicted in the deployed state with the adjustable body 302 forming a platform 312 having the platform surface 312A that is parallel to the surface 12 of the environment 10. In the deployed state, the platform surface 312A extends generally perpendicular to the central axis A. In other words, the adjustable body 302 is expanded outwardly relative to the base 306, thereby forming the platform 312 disposed over the surface 12 of the environment 10. The platform 312 is parallel to the surface 12 and the outer surface 303 of the adjustable body 302 is positioned on, and engaged with, the surface 12. In this instance, the deployable landing pad 300 is supported by the surface 12 of the environment 10. A size (i.e., radius) of the platform 312 formed by the adjustable body 302 is equivalent to a longitudinal length of the adjustable body 302 between the top end 304 and the base 306 when in the stowed state (FIG. 6). In the deployed state, the platform surface 312A includes a planar surface area that is greater than a planar surface area of the platform surface 312A when in the stowed state, the first intermediate state, and the second intermediate state.

With the platform 312 formed by the adjustable body 302, the material composition of the platform 312 is identical to a material composition of the adjustable body 302 (e.g., a metal) such that the platform 312 defines a hard surface suitable for receiving a VTOL vehicle thereon. As described in greater detail herein, the platform 312 formed by the adjustable body 302 is suitable for serving as a landing and takeoff platform for a VTOL vehicle. The platform 312 of the deployable landing pad 300 may include one or more markings 314, labels, insignia, and/or the like. For example, the platform 312 may include markings 314 indicative of a helipad location, such as a letter "H" positioned along a surface area of the platform 312 as shown herein.

The platform 312 is supported by the surface 12 of the environment 10 due to an engagement of the outer surface 303 with the surface 12. A height of the platform 312 of the deployable landing pad 300 relative to the surface 12 of the environment 10 may be adjusted (e.g., heightened) by actuating the deployment mechanism 316 with the deployable landing pad 310 in the deployed state.

For example, in some embodiments further actuation of the deployment mechanism 316 may provide for a translation of the deployable landing pad 300 from a lowered position to an extended position relative to the surface 12 of the environment 10. In particular, the base 306 of the deployable landing pad 300 may translate upward away from the surface 12 such that the platform 312 formed by the deployable landing pad 300 is elevated relative to the surface 12 of the environment 10. In this instance, the deployable landing pad 300 remains parallel to the surface 12 and the outer surface 303 is offset and disengaged from the surface 12.

Upon concluding use of the platform 312 for purposes of receiving a VTOL vehicle thereon, the deployable landing pad 300 may be transitioned to the stowed state (FIG. 6) by actuating the deployment mechanism 316 to translate the top end 304 upwardly away from the surface 12 and laterally inward toward the base 306. In this instance the adjustable body 302 returns to the stowed state defining a longitudinal length extending perpendicular to the surface 12 and between the top end 304 and the base 306. In this instance, the outer surface 303 of the adjustable body 302 is displayed such that the decorative design 301 located thereon is visibly displayed within the environment 10. In contrast, the markings 314 along the platform 312 are hidden within the adjustable body 302 when the deployable landing pad 300 is in the stowed state (FIG. 6).

Figure 10:
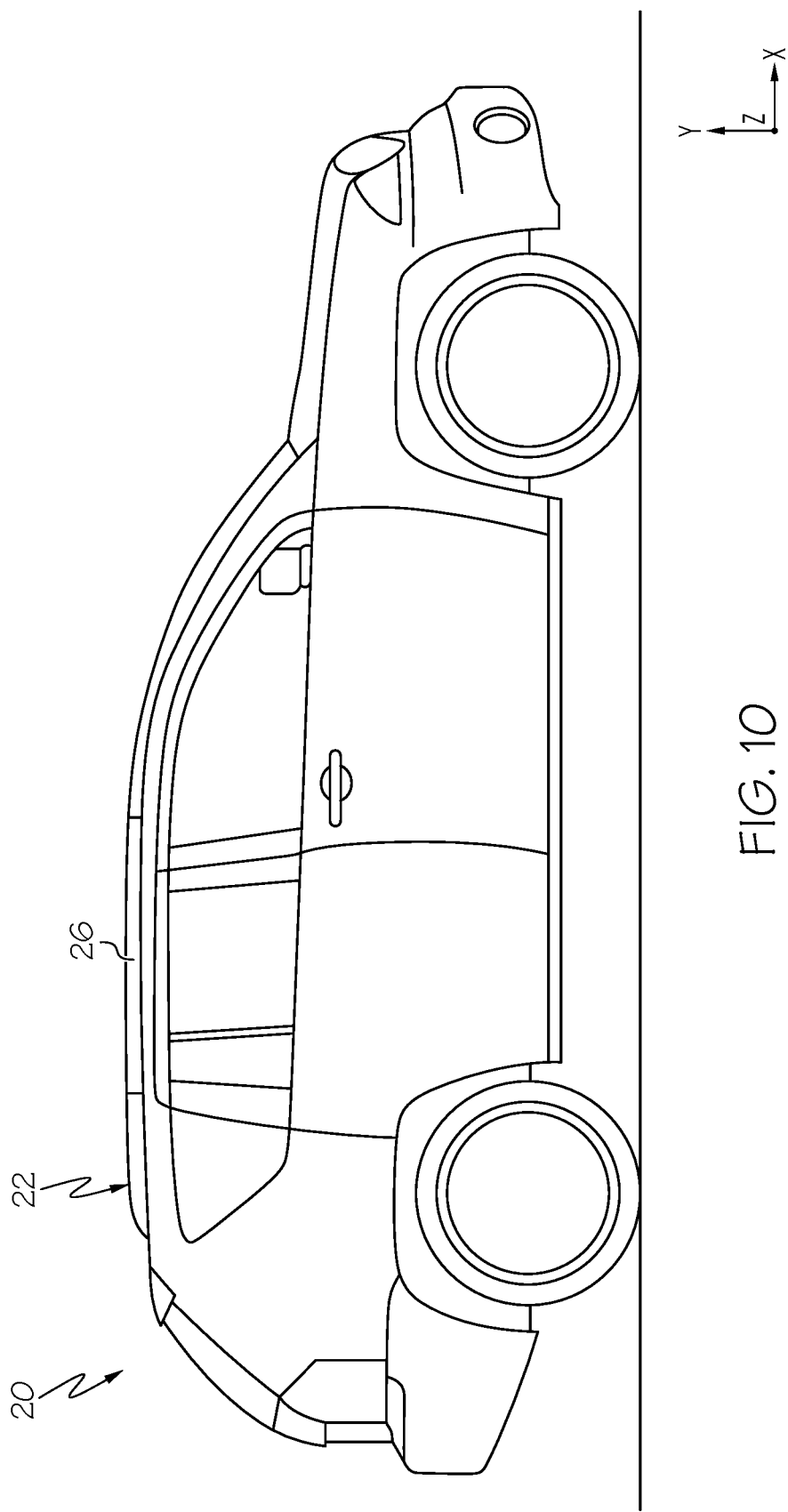
FIG. 10 schematically depicts still another illustrative embodiment of a deployable landing pad disposed within a roof of a vehicle in a stowed state according to one or more embodiments of the present disclosure.
Figure 11:
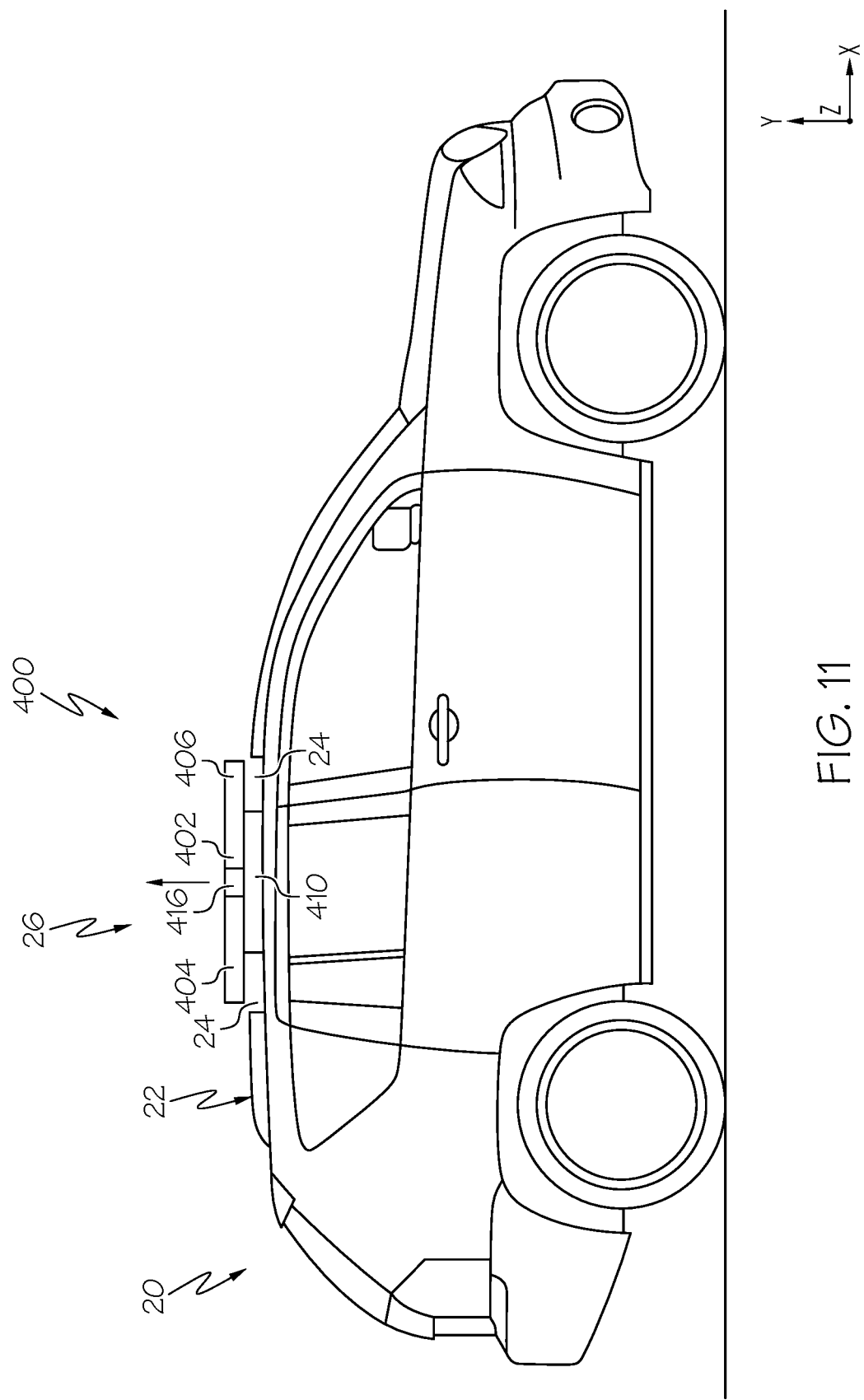
FIG. 11 schematically depicts the deployable landing pad of FIG. 10 in a first intermediate state relative a roof of the vehicle according to one or more embodiments of the present disclosure.
Figure 12:
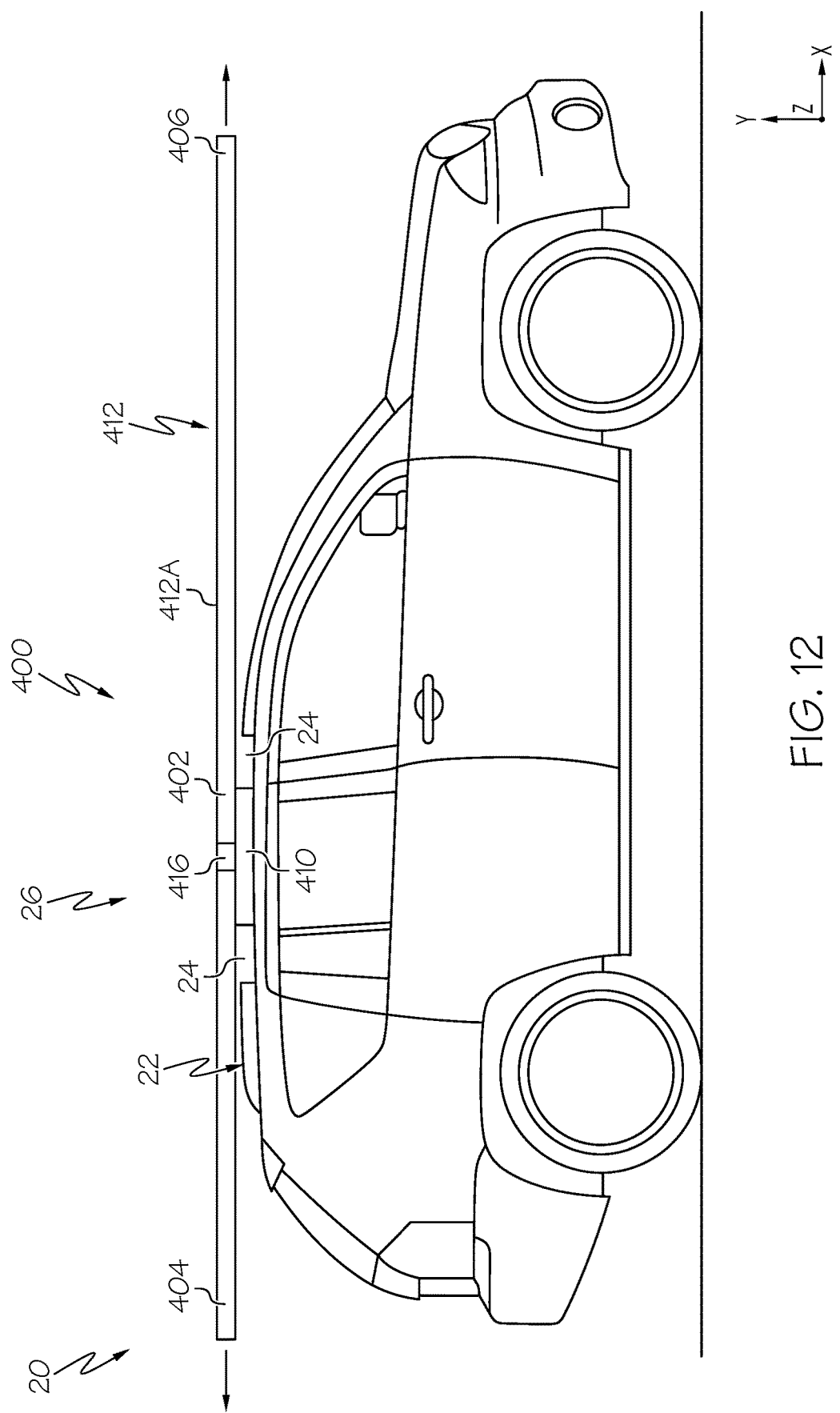
FIG. 12 schematically depicts the deployable landing pad of FIG. 10 in a deployed state according to one or more embodiments of the present disclosure.

Referring to FIGS. 10-12, a non-limiting example of a deployable landing pad assembly that includes a deployable landing pad 400 is depicted. In the illustrated embodiment, the deployable landing pad 400 is provided on a vehicle 20. In the embodiment, the vehicle 20 is a sports utility vehicle (SUV), however, in other embodiments the vehicle 20 may be a truck, car, van, or other types of motor vehicles. The vehicle 20 of the present embodiment includes a roof 22 that extends along a longitudinal length of the vehicle 20 (i.e., in the vehicle-longitudinal direction). The roof 22 of the vehicle 20 further includes a panel 26 that is selectively moveable by an operator of the vehicle 20 between an open position and a closed position.

As seen in FIGS. 10-12, with the panel 26 in a closed position relative to the roof 22, a panel opening 24 along the roof 22 that is formed at a location of the panel 26 is closed such that the deployable landing pad 400 does not extend external from the vehicle 20. Rather, the deployable landing pad 400 is disposed within the roof 22 of the vehicle 20. In this instance, the deployable landing pad 400 is in a stowed state, disposed within a frame of the roof 22 of the vehicle 20, and in particular the deployable landing pad 400 is positioned within the roof 22 of the vehicle 20. In some embodiments, with the deployable landing pad 400 in the stowed state, the deployable landing pad 400 may be positioned level with the roof 22 such that at least a portion of the deployable landing pad 400 is exposed from within the vehicle 20.

Referring now to FIG. 11, the deployable landing pad 400 is depicted in a first intermediate state wherein the deployable landing pad 400 extends through the opening 24 formed by a translation of the panel 26 in the vehicle-longitudinal direction (i.e., the +/−X direction of the coordinate axes in FIGS. 10-12). The deployable landing pad 400 includes an adjustable body 402, a rear end 404, a front end 406, and a base 410. The adjustable body 402 and the base 410 of the deployable landing pad 400 extend through the opening 24 along the roof 22 in the vehicle-vertical direction (i.e., the +/−Y direction of the coordinate axes in FIGS. 10-12). In the first intermediate state, the rear end 404 and the front end 406 of the adjustable body 402 are positioned within the opening 24 formed by the panel 26. As such, the adjustable body 402 is translatable in the vehicle-vertical direction (i.e., the +/−Y direction of the coordinate axes in FIGS. 10-12) from the stowed state (FIG. 10) to the first intermediate state (FIG. 11), and vice versa, through the opening 24 due to a relative distance between the rear end 404 and the front end 406 of the deployable landing pad 400 and a size of the opening 24. Specifically, in the first intermediate state, the distance between the front end 406 and the rear end 404 is less than a distance of the opening 24.

It should be understood that a longitudinal length of the adjustable body 402 of the deployable landing pad 400, in the vehicle-horizontal direction, is selectively adjustable relative to the base 410 such that a distance between the rear end 404 and the front end 406 of the deployable landing pad 400 in the vehicle-horizontal direction may be adjusted (e.g., increased or decreased). In this instance, the adjustable body 402 includes a deployed state such that the rear end 404 and the front end 406 of the deployable landing pad 400 are extendable in the vehicle-horizontal direction relative to the base 410. In other embodiments, the rear end 404 and the front end 406 are translatable in the vehicle-horizontal direction relative to the base 410 such that the adjustable body 402 is selectively expanded in the +/−X direction of the coordinate axes in the FIGS. 10-12 in response to translation of the rear end 404 and/or the front end 406.

Furthermore, a lateral width of the adjustable body 402 of the deployable landing pad 400, in the vehicle-lateral direction (+/−Z direction of coordinate axes of FIGS. 10-12), is selectively adjustable relative to the base 410 such that a thickness of the deployable landing pad 400 in the vehicle-lateral direction may be adjusted (e.g., increased or decreased). In this instance, the adjustable body 402 includes a deployed state such that a width of the deployable landing pad 400 is extendable in the vehicle-lateral direction relative to the base 410. In other embodiments, a width of the adjustable body 402 is translatable in the vehicle-lateral direction relative to the base 410 such that the adjustable body 402 is selectively expanded in the +/−Z direction of the coordinate axes in the FIGS. 10-12 in response to an outward translation of the rear end 404 and/or the front end 406.

In the present example, the deployable landing pad 400 is coupled to a deployment mechanism 416 (not shown) that is configured to move, and specifically translate, the deployable landing pad 400 in the vehicle-vertical direction from the stowed state (FIG. 10) to a first intermediate state (FIG. 11). As further described herein, the deployment mechanism 416 is further configured to move, and in particular expand, the deployable landing pad 400 in the vehicle-horizontal direction from the first intermediate state (FIG. 11) to a deployed state (FIG. 12). Additionally, the deployment mechanism 416 may further be configured to move, and in particular expand, the deployable landing pad 400 in the vehicle-lateral direction when transitioning from the first intermediate state to the deployed state to thereby increase a lateral width of the adjustable body 402.

According to one embodiment, the deployment mechanism 416 may include, but is not limited to, a motor, an actuator. In this instance, the motor activates the actuator, which may be coupled to control linkages used to drive the adjustable body 402 of the deployable landing pad 400 from the stowed state to the first intermediate state (FIG. 11) and the deployed state (FIG. 12). The motor of the deployment mechanism 416 may be any type of motor suitable for driving the actuator, including, for example, an electric motor, a hydraulic system, pneumatic system, mechanical system and the like. The deployment mechanism 416 may be controlled by a control system (not shown) of the vehicle 20 which may allow user-operated and/or automated control through a variety of measures, for example, wireless communications, radio waves, direct connection to handheld device, operating controls of the vehicle 20, and the like. The actuator of the deployment mechanism 416 may include a linear actuator that is configured to convert rotational motion into linear motion. A manual deployment mechanism for raising and lowering the deployable landing pad 400 in the vehicle-vertical direction (+/−Y direction of coordinate axes of FIGS. 10-12), vehicle-horizontal direction (+/−X direction of coordinate axes of FIGS. 10-12), and/or vehicle-lateral direction (+/−Z direction of coordinate axes of FIGS. 10-12) may be further provided. It should be understood that the configuration of the deployment mechanism 416 and/or the manual deployment mechanism is not limited to the components described herein such that various drive assemblies and associated control components may be communicatively coupled to the deployable landing pad 400 without departing from the scope of the present disclosure.

Referring now to FIG. 12, the deployable landing pad 400 is depicted in the deployed state with the adjustable body 402 of the deployable landing pad 400 fully extended along a longitudinal length of the vehicle 20 (i.e., the vehicle-horizontal direction). The adjustable body 402 is sized to form a landing and takeoff platform 412 having a platform surface 412A for a VTOL vehicle to be received thereon when in the deployed state. Accordingly, it should be understood that a relative size of a VTOL vehicle to be received on the deployable landing pad 400 may be determinative of the total planar surface area of the landing and takeoff platform surface 412A formed by the adjustable body 402 of the deployable landing pad 400. For example the adjustable body 402 of the deployable landing pad 400 may be sized to define a total planar surface area of the platform surface 412A that includes a minimum length that is at least 50%, 100%, 150%, or greater than an overall length of the VTOL vehicle to be received thereon or an overall length of the landing gear of the VTOL vehicle. The adjustable body 402 may further be sized to define a total planar surface area of the platform surface 412A that includes a minimum width that is at least greater than an overall width of the landing gear of the VTOL vehicle. In the deployed state, the platform surface 412A includes a planar surface area that is greater than a planar surface area of the platform surface 412A when in the stowed state and the first intermediate state.

It should further be understood that the adjustable body 402 of the deployable landing pad 400 may comprise various other shapes, such as oval, rectangular, square, sizes, and configurations than those shown and described herein. The adjustable body 402 of the deployable landing pad 400 is formed of a material that is fabricated and configured to form a hard surface suitable for receiving and supporting a VTOL vehicle thereon. The material of the adjustable body 402 is further configured to be selectively movable to accommodate an expansion and collapse of the adjustable body 402 in the vehicle-horizontal direction from a stowed state (FIG. 11) to a deployed state (FIG. 12). For example, the adjustable body 402 may be formed of a metal, such as steel, titanium, and alloys of the like. In some embodiments, the adjustable body 402 of the deployable landing pad 400 may be formed of telescoping panels and/or foldable panels that are configured to selectively expand and collapse between the stowed state, the first intermediate state, and the deployed state.

As seen in FIG. 10, the deployable landing pad 400 is initially in the stowed state. In the stowed state, the adjustable body 402 is disposed within the roof 22 of the vehicle 20 such that the deployable landing pad 400 is not extended outwardly from the vehicle 20. With the panel 26 of the vehicle 20 in a closed position, the opening 24 along the roof 22 is sealed to maintain the deployable landing pad 400.

Upon moving the panel 26 of the vehicle 20 to form the opening 24 along the roof 22, the control system may be actuated to operate the deployment mechanism 416. In this instance, the deployment mechanism 416 operates to move the deployable landing pad 400 from the stowed state to the first intermediate state. Specifically, the deployment mechanism 416 operates to raise the base 410 of the deployable landing pad 400 through the opening 24 along the roof 22. In the first intermediate position, the adjustable body 402, the rear end 404, and the front end 406 extend through the opening 24 and outwardly from the roof 22 in the vehicle-vertical direction. It should be understood that in some embodiments the base 410 may be at least partially received within the opening 24 when the deployable landing pad 400 is in the first intermediate state. In other embodiments the base 410 may fully extend through the opening 24 and above the roof 22 when in the first intermediate state such that the adjustable body 402 is elevated at an increased height, in the vehicle-vertical direction, relative to the roof 22 of the vehicle 20.

The continued operation of the deployment mechanism 416 moves the deployable landing pad 400 from the first intermediate state shown in FIG. 11 to the deployed state shown in FIG. 12. Specifically, the deployment mechanism 416 operates to provide a linear translation of the rear end 404 and the front end 406 to thereby extend and/or expand a length of the adjustable body 402 in the vehicle-horizontal direction. Additionally, the deployment mechanism 416 operates to provide a lateral translation of the adjustable body 402 to thereby extend and/or expand a width of the adjustable body 402 in the vehicle-lateral direction.

The platform 412 formed by the adjustable body 402 is elevated relative to the roof 22 of the vehicle 20. In other words, the adjustable body 402 is positioned above the roof 22 in the vehicle-vertical direction, and expanded outwardly in the vehicle-horizontal direction relative to the base 410. In particular, the rear end 404 and the front end 406 translate outwardly in the vehicle-horizontal direction relative to the base 410. The rear end 404 and the front end 406 translate parallel to a longitudinal length of the vehicle 20 (i.e., the +/−X direction of the coordinate axes in FIGS. 10-12) such that a length of the adjustable body 402 increases in the vehicle-horizontal direction. Accordingly, the platform surface 412A of the platform 412 is formed parallel to the roof 22 of the vehicle 20. The rear end 404 and the front end 406 of the deployable landing pad 400 are positioned beyond the opening 24 formed by the panel 26. A size, and in particular a longitudinal length of the adjustable body 402 in the deployed state is predetermined based on a total planar area to be formed by the adjustable body 402. The platform surface 412A of the platform 412 formed by the adjustable body 402 is suitable for serving as a landing and takeoff platform for a VTOL vehicle.

The platform 412 is elevated in the vehicle-vertical direction relative to the roof 22 of the vehicle 20 at a length substantially equivalent to a distance between the adjustable body 402 and the base 410. A height of the platform 412 of the deployable landing pad 400 in the vehicle-vertical direction and relative to the roof 22 of the vehicle 20 may be adjusted (e.g., raised or lowered) by actuating the deployment mechanism 416 with the deployable landing pad 400 in the deployed state (FIG. 12). In these instances, the base 410 translates in the vehicle-vertical direction out of and/or into the opening 24 of the roof 22 while the deployable landing pad 400 is in the deployed state.

Upon concluding use of the platform 412 for purposes of receiving a VTOL vehicle thereon, the deployable landing pad 400 may be transitioned to the stowed state by actuating the deployment mechanism 416 to translate the rear end 404 and the front end 406 inwardly relative to the base 410 until the adjustable body 402 returns to the first intermediate state. In this instance, the rear end 404 and the front end 406 are positioned within a length of the opening 24 of the roof 22 in the vehicle-horizontal direction. The deployable landing pad 400 may be transitioned to the stowed state by further actuating the deployment mechanism 416 to translate the adjustable body 402 and the base 410 downwardly through the opening 24, thereby disposing the deployable landing pad 400 within the roof 22. In this instance, the adjustable body 402, the rear end 404, the front end 406, and the base 410 are positioned within the roof 22. In some embodiments the adjustable body 402 may be positioned level with the roof 22 when the deployable landing pad 400 is in the stowed state. Although not shown, it should be understood that in some embodiments the platform surface 412A of the platform 412 of the deployable landing pad 400 may include one or more markings, labels, insignia, and/or the like. For example, the platform 412 may include markings indicative of a helipad location, as shown in FIG. 9, such as a letter "H" positioned along a surface area of the platform 412.

Figure 13:
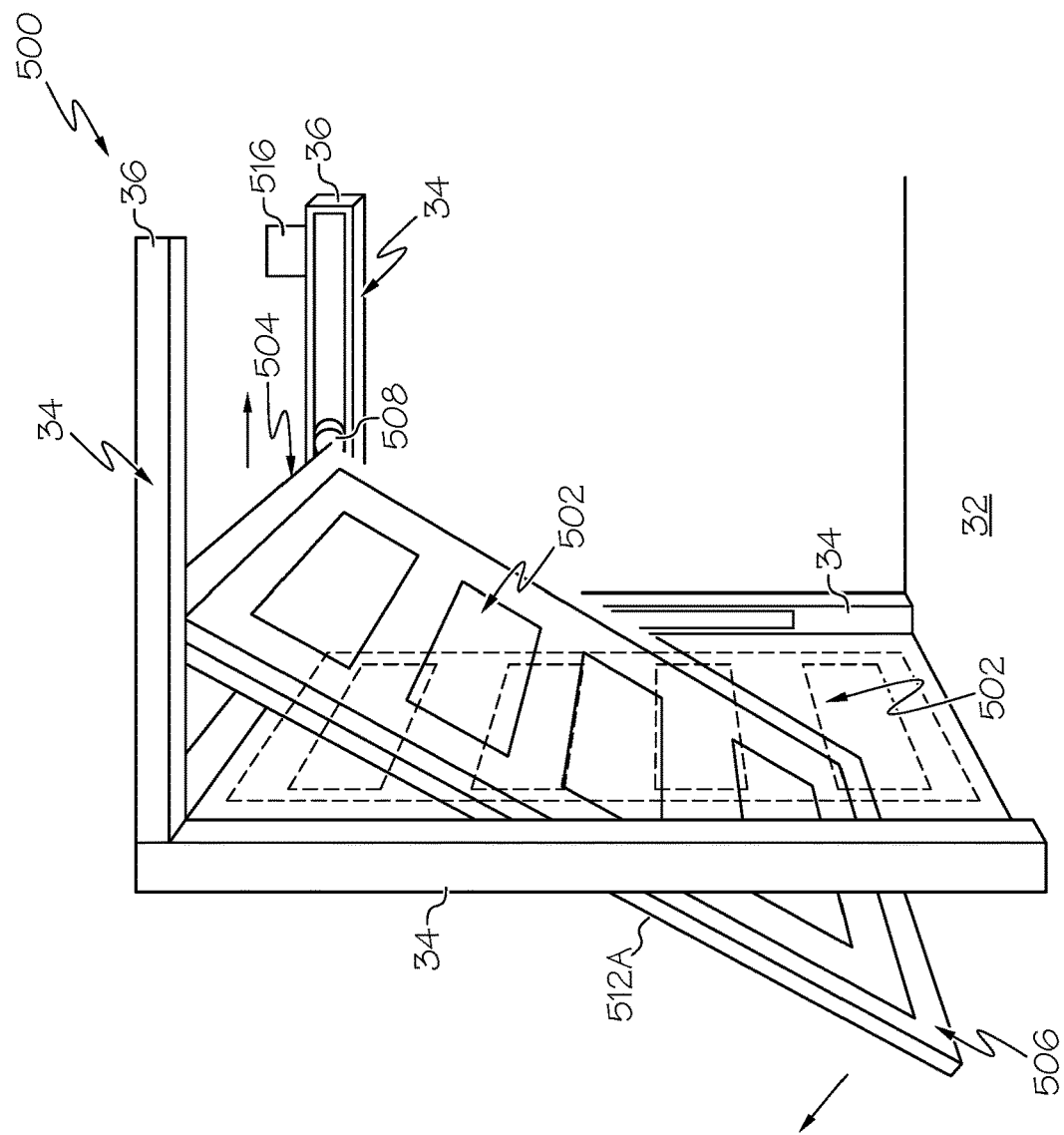
FIG. 13 schematically depicts another illustrative embodiment of a deployable landing pad as a garage door in a stowed state and a first intermediate state according to one or more embodiments of the present disclosure.
Figure 14:
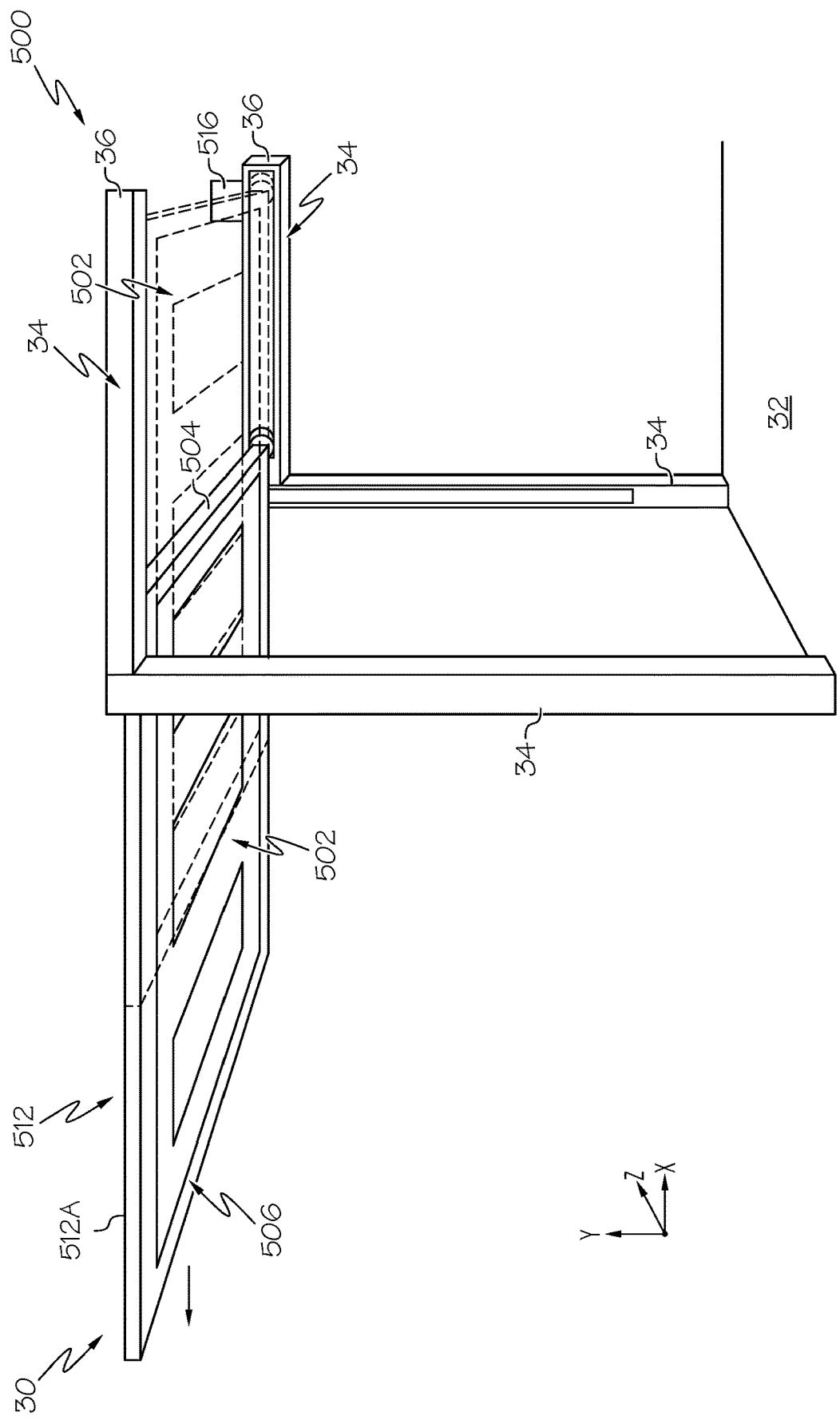
FIG. 14 schematically depicts the deployable landing pad of FIG. 13 with the garage door in a deployed state according to one or more embodiments of the present disclosure.

Referring to FIGS. 13-14, a non-limiting example of a deployable landing pad assembly that includes a deployable landing pad assembly as a garage door 500 provided for a garage 30. The garage door 500 is configured as a deployable landing pad provided in a garage 30. In particular, the garage 30 may be that of a building structure, such as a residential home, that includes a driveway surface 32 and a frame 34. The garage door 500 of the present example includes a planar body 502, a top end 504, and a bottom end 506. The planar body 502 of the garage door 500 extends between the top end 504 and the bottom end 506 such that a longitudinal length of the planar body 502 is defined therebetween. The planar body 502 of the present example defines a platform surface 512A extending between the top end 504 and the bottom end 506.

As will be described in greater detail herein, the garage door 500 of the present example is movable between a stowed state shown in dashed lines in FIG. 13, a first intermediate state shown in FIG. 13, a deployed state shown in FIG. 14, and a retracted state shown in dashed lines in FIG. 14. A size, and in particular a surface area, of the platform surface 512A of the planar body 502 is predetermined based on a total planar area to be formed by the planar body 502 when in a deployed state (FIG. 14). As will be described in greater detail herein, the planar body 502 is sized to form a landing and takeoff platform 512 for a VTOL vehicle when in the deployed state. Accordingly, it should be understood that a relative size of a VTOL vehicle to be received on the garage door 500 may be determinative of the total planar area of the landing and takeoff platform 512, and in particular the platform surface 512A, formed by the planar body 502 of the garage door 500.

For example, the planar body 502 of the garage door 500 may be sized to define a total planar surface area along the platform surface 512A that includes a minimum length that is at least 150 percent greater than an overall length of the VTOL vehicle to be received thereon or an overall length of a landing gear of the VTOL vehicle. It should further be understood that the planar body 502 of the garage door 500 may comprise various other shapes, sizes, and configurations than those shown and described herein. The planar body 502 of the garage door 500 is formed of a material that is fabricated and configured to form a hard surface suitable for receiving and supporting a VTOL vehicle thereon, such as, for example, a metal.

Still referring to FIG. 13, the planar body 502 of the garage door 500 is slidably coupled to the frame 34 of the garage 30 such that the garage door 500 is movable relative to the frame 34 between a stowed state (shown in dashed lines), a first intermediate state, a second intermediate state (shown in dashed lines in FIG. 14), and a deployed state (FIG. 14). When in a stowed state the garage door 500 is in a closed position shown in dashed lines, the bottom end 506 of the garage door 500 is engaged against the driveway surface 32 and positioned within the frame 34 of the garage 30. In this instance, the garage door 500 is positioned in a vertical-orientation relative to the driveway surface 32 such that the planar body 502 is positioned perpendicular to the driveway surface 32. In some embodiments, with the garage door 500 in the first intermediate state, the bottom end 506 may be disengaged from the driveway surface 32 such that at least a portion of the garage door 500 extends beyond the frame 34 of the garage 30.

In the present example the garage door 500 is coupled to a deployment mechanism 516 that is configured to move, and specifically pivot, the garage door 500 from the closed position to an open position (i.e., the second intermediate state). As further described herein, the deployment mechanism 516 is further configured to move, and in particular laterally translate, the garage door 500 in a garage-horizontal direction from the stowed state, that is the closed position, to the first intermediate state, that is the partially closed position, to the second intermediate state and the deployed state, in which the deployed state and the second intermediate state are the open position of the garage door 500 (FIG. 14).

According to one embodiment, the deployment mechanism 516 may include, but is not limited to, an electric motor, torsion springs and counterbalance cables. The torsion springs apply a torque to the planar body 502, thereby generating a force onto the garage door 500 via the counterbalance cables. The motor of the deployment mechanism 516 may be any type of motor suitable for moving the garage door 500, including, for example, an electric motor, a hydraulic system, pneumatic system, mechanical system and the like. The deployment mechanism 516 may be controlled by a control system (not shown) which may allow user-operated and/or automated control through a variety of measures, for example, wireless communications, radio waves, direct connection to handheld device, and the like.

The counterbalance springs are coupled to the garage door 500 and are configured to offset a weight of the garage door 500 such that the motor of the deployment mechanism 516 is not required to generate power directly proportional to a weight of the garage door 500. In other words, the counterbalance springs may be utilized to assist the motor in raising the planar body 502 of the garage door 500, which may minimize a corresponding size requirement of the motor thereby permitting a smaller motor to be required for installation within the garage 30. A manual deployment mechanism for raising and lowering the garage door 500 may be further provided for instances of loss of electrical power and/or failure of one or more of the motor, torsion springs, counterbalance cables, and/or control system. It should be understood that the configuration of the deployment mechanism 516 and/or the manual deployment mechanism is not limited to the components described herein such that various drive assemblies and associated control components may be communicatively coupled to the garage door 500 without departing from the scope of the present disclosure.

Referring to FIG. 13, the top end 504 of the garage door 500 is movably coupled to the garage 30 along the frame 34. In particular, tracks 36 of the frame 34 slidably receives an attachment mechanism 508 of the garage door 500 at the top end 504 such that the garage door 500 is translatable in a garage-horizontal direction along the tracks 36 of the garage 30. The tracks 36 of the frame 34 extend in the garage-horizontal direction, parallel to the driveway surface 32, such that the garage door 500 is translatable in a direction parallel to the driveway surface 32. Accordingly, a linear translation of the top end 504 of the deployable landing 500 along the tracks 36 may provide a pivot of the planar body 502 (FIG. 13) from a vertical orientation perpendicular to the driveway surface 32 to a horizontal orientation parallel to the driveway surface 32 (FIG. 14), and vice versa.

As seen in FIG. 13, the garage door 500 is initially in the stowed state shown in dashed lines. In the stowed state, the planar body 502 is engaged with the driveway surface 32 and the garage door 500 is in a fully closed position such that an interior storage area of the garage 30 is inaccessible from an exterior. Further, the planar body 502 of the garage door 500 is maintained within the frame 34 of the garage 30. Upon actuation of the control system, the deployment mechanism 516 operates to move the garage door 500 from the stowed state shown in dashed lines to the first intermediate state. Specifically, the deployment mechanism 516 operates to raise the bottom end 506 relatively upward in the garage-vertical direction such that the bottom end 506 disengages and moves away from the driveway surface 32. Further, the deployment mechanism 516 operates to extend the bottom end 506 outward from the frame 34 of the garage 30 and simultaneously extend the top end 504 inward into an interior of the garage 30 as the attachment mechanism 508 translates within the tracks 36.

Referring now to FIG. 14, the continued operation of the deployment mechanism 516 moves the garage door 500 into the second intermediate state shown in dashed lines. In the second intermediate state, the garage door 500 is depicted with the planar body 502 forming a platform 512 that is elevated relative to the driveway surface 32 of the garage 30. The platform 512 is extended laterally outward in a garage-horizontal direction from the frame 34 of the garage 30 and the platform surface 512A of the platform 512 faces opposite of the driveway surface 32. In other words, the planar body 502 is extended outwardly relative to the frame 34 thereby forming the platform 512 external to the garage 30.

Still referring to FIG. 14, continued operation of the deployment mechanism 516 operates to move the garage door 500 from the second intermediate state shown in dashed lines to the deployed state. In particular, upon actuation of the deployment mechanism the top end 504 of the garage door 500 slidably translates along the tracks 36 of the frame 34 in a garage-horizontal direction. As the garage door 500 moves from the second intermediate state to the deployed state, the platform 512 translates from being partially maintained within the garage 30 to being fully extended external to the frame 34 of the garage 30. In other words, the platform surface 512A is fully exposed from the frame 34 of the garage 30 for receiving a VTOL vehicle thereon. A size, and in particular of an area of the platform surface 512A, of the platform 512 formed by the planar body 502 is equivalent to a longitudinal length of the planar body 502 between the top end 504 and the bottom end 506 and a lateral width of the planar body 502 between opposing sides of the garage door 500.

As the top end 504 and the bottom end 506 translate toward an exterior of the garage 30, the planar body 502 of the garage door 500 extends outwardly from the garage 30 thereby exposing the platform surface 512A to a surrounding atmosphere. With the platform 512 formed by the planar body 502, the material composition of the platform 512 is identical to a material composition of the planar body 502 which is configured to define a hard surface that is suitable of receiving and supporting a VTOL vehicle thereon. The platform 512 is elevated relative to the driveway surface 32 and extends outwardly from the garage 30 such that the platform 512 is exposed and capable of receiving a VTOL vehicle thereon. Although not shown, it should be understood that in some embodiments the platform surface 512A of the garage door 500 may include one or more markings, labels, insignia, and/or the like. For example, the platform surface 512A may include markings indicative of a helipad location, as shown in FIG. 9, such as a letter "H" positioned along a surface area of the platform 512.

Upon concluding use of the platform surface 512A of the platform 512 for purposes of receiving a VTOL vehicle, the garage door 500 may be transitioned to the stowed state by actuating the deployment mechanism 516 to translate the top end 504 and the bottom end 506 inwardly into the garage 30 in a garage-horizontal direction toward the second intermediate state shown in dashed lines on FIG. 14. In this instance, the platform 512 is disposed within the garage 30 and the garage door 500 is moved to the open position. Further, the garage door 500 may be transitioned to the closed position by further actuating the deployment mechanism 516 to translate the planar body 502 downwardly toward the driveway surface 32 to the first intermediate state shown in FIG. 13. Continued actuation of the deployment mechanism 516 moves the garage door 500 to the stowed state, thereby positioning the garage door 500 in a vertical orientation perpendicular to the driveway surface 32. In this instance, the planar body 502, the top end 504, and the bottom end 506 are perpendicular to the driveway surface 32 with the bottom end 506 engaged thereon.

Figure 15:
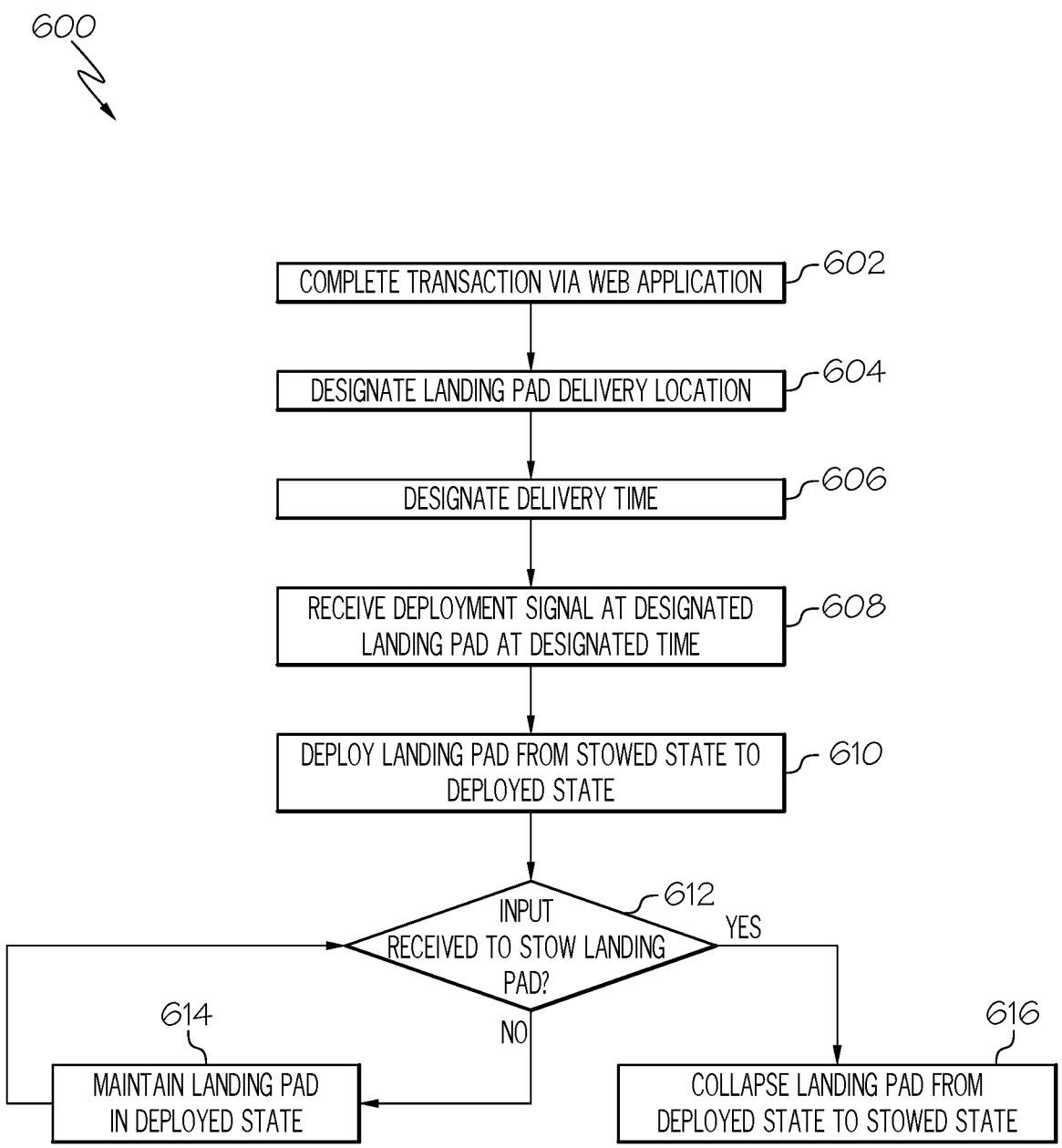
FIG. 15 is a flow diagram of an illustrative method of deploying a deployable landing pad according to one or more embodiments of the present disclosure.

Referring now to FIG. 15, a flow diagram illustrating a non-limiting example of a method 600 of remotely deploying a deployable landing pad is depicted. It should be understood that the steps described herein, and the sequence in which they are presented, are merely illustrative such that additional and/or fewer steps may be included without departing from the scope of the present disclosure. It should further be understood that the illustrative method 600 described and shown herein may be employed with various deployable landing pads, including at least the deployable landing pad 100, 200, 300, 400, 500 described above.

Initially, at step 602, a transaction may be completed through a web application, for example, in which the purchaser may thereafter desire to arrange for a delivery of the transacted-item by a VTOL vehicle to a particular location at a specified time. In this instance, the purchaser may be presented with an option for selecting an available landing pad as the location for delivering the transacted-item at a particular time. The purchaser may be presented with various locations including deployable landing pads, including, for example, the deployable landing pad 100, 200, 300, 400, 500. At step 604 the purchaser may designate a respective location of a landing pad for the transacted-item to be delivered to. At step 606, the purchaser may designate a delivery time to receive the transacted-item at the delivery pad location. At step 608, an electrical signal indicative of the request to access the deployable landing pad 100, 200, 300, 400, 500 is transmitted, such as, for example, from the web application, a server, a remote device, a remote station, a mobile device, and the like. In the present example, the deployment signal may be transmitted from a web application to a deployable landing pad 100, 200, 300, 400, 500 that is specified by the location selected by the purchaser at the designated time.

In some embodiments, the web application may provide informational data to an operator of the application relating to one or more deployable landing pads 100, 200, 300, 400, 500. For example, the information data may provide an availability of one or more deployable landing pads 100, 200, 300, 400, 500, a proximity of one or more deployable landing pads 100, 200, 300, 400, 500 relative to a target location (e.g., the purchaser's current location, a designated location, the purchaser's home location, a location of the purchaser's mobile device), a relative size capacity of a platform 112, 212, 312, 412, 512 of the one or more deployable landing pads 100, 200, 300, 400, 500, pricing information for reserving the deployable landing pads 100, 200, 300, 400, 500, and the like. Further at step 608, the signal to deploy the selected deployable landing pad 100, 200, 300, 400, 500 is received at the selected landing pad 100, 200, 300, 400, 500 at the designated time such that the selected landing pad 100, 200, 300, 400, 500 may be adequately reserved and autonomously activated at the designated landing time.

At step 610, the selected landing pad 100, 200, 300, 400, 500 is deployed from a stowed state to a deployed state to thereby extend and/or expand the landing pad to form the platform 112, 212, 312, 412, 512 suitable for receiving a VTOL vehicle thereon. With the platform 112, 212, 312, 412, 512 of the selected landing pad 100, 200, 300, 400, 500 positioned in the deployed state, a VTOL vehicle may be received thereon. A visibility of the deployable landing pad 100, 200, 300, 400, 500 may be enhanced by an inclusion of one or more markings, indicia, lights, and the like along a surface area of the platform 112, 212, 312, 412, 512. The platform 112, 212, 312, 412, 512 of the selected landing pad 100, 200, 300, 400, 500 may be maintained in the deployed state until an electrical signal indicative of an input to stow the selected landing pad 100, 200, 300, 400, 500 is received from the web application. In the interim, the web application may provide real-time information relating to a present use of the deployable landing pad 100, 200, 300, 400, 500 to thereby indicate an unavailability of the selected landing pad 100, 200, 300, 400, 500 for the designated duration of the reservation. Additional and/or fewer information or data relating to the selected landing pad 100, 200, 300, 400, 500 may be provided to operators of the web application, such as, for example, an identification of an occupant of the selected landing pad 100, 200, 300, 400, 500, a type of VTOL vehicle presently received at the selected landing pad 100, 200, 300, 400, 500, and the like.

At step 612, upon the departure of the VTOL vehicle from the platform 112, 212, 312, 412, 512 of the landing pad 100, 200, 300, 400, 500, an electrical signal indicative of a command to transition the deployable landing pad 100, 200, 300, 400, 500 from the deployed state to a stowed state is transmitted and received at the deployable landing pad 100, 200, 300, 400, 500. In some embodiments, the electrical signal may be transmitted in response to the web application receiving an input from an autonomous VTOL vehicle, an operator of the VTOL vehicle, and/or the deployable landing pad 100, 200, 300, 400, 500 indicating a departure of the VTOL vehicle from the platform 112, 212, 312, 412, 512 of the deployable landing pad 100, 200, 300, 400, 500. Specifically, the deployable landing pad 100, 200, 300, 400, 500 may include one or more sensors that are configured to detect a departure of a VTOL vehicle from the platform 112, 212, 312, 412, 512 such that the deployable landing pad 100, 200, 300, 400, 500 autonomously transmits an input to collapse and/or retract the deployable landing pad 100, 200, 300, 400, 500 from the deployed state to the stowed state.

At step 614, in response to determining that an input command to transition the deployable landing pad 100, 200, 300, 400, 500 to the stowed state has not been received at step 612, the platform 112, 212, 312, 412, 512 of the deployable landing pad 100, 200, 300, 400, 500 is maintained in the stowed state. It should be understood that the inquiry at step 612 may be periodically determined at a predetermined interval. At step 616, in response to determining that an input command to transition the deployable landing pad 100, 200, 300, 400, 500 to the stowed state has been received at step 612, the platform 112, 212, 312, 412, 512 of the deployable landing pad 100, 200, 300, 400, 500 may be retracted and/or collapsed to return the deployable landing pad 100, 200, 300, 400, 500 to the stowed state.

Alternatively, an overall length of landing gear of the VTOL vehicle may be determinative of a size of the adjustable body 302 of the deployable landing pad 300.

It is noted that the terms "substantially" and "partially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of deploying a landing pad, for a vertical takeoff and landing vehicle, relative to a surface of an environment in which the landing pad is disposed, the method comprising:
   stowing an adjustable body of the landing pad in a stowed state, the adjustable body includes a platform surface, in the stowed state the platform surface defines a first planar surface area relative to the surface, the first planar surface area being inoperable to receive the vertical takeoff and landing vehicle thereon; and
   deploying the adjustable body from the stowed state to an intermediate state by moving the adjustable body upwardly, and then deploying the adjustable body to a deployed state by moving the adjustable body downwardly toward the surface, in the deployed state the platform surface defines a second planar surface area greater than the first planar surface area, the second planar surface area of the platform surface is sized and shaped to receive the vertical takeoff and landing vehicle thereon in the deployed state.

2. The method of claim 1, wherein in the stowed state the platform surface extends generally parallel to a central axis of the adjustable body and in the deployed state the platform surface extends generally perpendicular to the central axis, and
   wherein adjusting the adjustable body from the stowed state to the deployed state includes translating the platform surface radially outward relative to the central axis.

3. The method of claim 2, wherein in the stowed state the adjustable body is at least partially received within a cavity extending downwardly from the surface, the cavity extending generally parallel with the central axis of the adjustable body.

4. The method of claim 3, wherein in the stowed state a top end of the adjustable body is positioned level with or beneath the surface.

5. The method of claim 4, wherein:
   in the intermediate state the platform surface defines the first planar surface area relative to the surface, the platform surface extends generally parallel to the central axis, and the top end of the adjustable body is positioned a predetermined distance above the surface.

6. The method of claim 1, wherein the adjustable body includes a material that is attached to and extends between a plurality of beams such that extending the adjustable body from the stowed state to the deployed state comprises
   separating the plurality of beams relative one another from a compacted position to an expanded position.

7. The method of claim 6, further comprising
   widening the material positioned between the plurality of beams when separating the plurality of beams from the compacted position to the expanded position such that the material forms the platform surface.

8. A deployable landing pad assembly for a vertical takeoff and landing vehicle, relative to a surface of an environment in which the landing pad is disposed, the deployable landing pad assembly comprising:
   an adjustable body that includes an adjustable platform surface, the adjustable body movable between a stowed state, an intermediate state, and a deployed state, in the stowed state the platform surface defines a first planar surface area relative to the surface, the first planar surface area being inoperable to receive the vertical takeoff and landing vehicle thereon, in the deployed state the platform surface defines a second planar surface area greater than the first planar surface area, the second surface planar area of the platform surface is sized and shaped to receive the vertical takeoff and landing vehicle thereon in the deployed state; and
   a deployment mechanism configured to move the adjustable body from the stowed state to the intermediate state by moving the adjustable body upwardly, and then to the deployed state by moving the adjustable body downwardly toward the surface.

9. The deployable landing pad assembly of claim 8, wherein in the stowed state the platform surface of the adjustable body has a generally cylindrical shape that extends generally parallel to a central axis of the adjustable body, and in the deployed state the platform surface of the adjustable body has a generally planar shape that extends generally perpendicular to the central axis of the adjustable body.

10. The deployable landing pad assembly of claim 9, wherein the deployment mechanism is configured to translate the platform surface radially outward relative to the central axis when moving the adjustable body from the stowed state to the deployed state.

11. The deployable landing pad assembly of claim 10, wherein in the stowed state the adjustable body is at least partially received within a cavity extending downwardly from the surface, the cavity extending generally parallel with the central axis of the adjustable body.

12. The deployable landing pad assembly of claim 11, wherein in the stowed state a top end of the adjustable body is positioned level with or beneath the surface.

\* \* \* \* \*